US00RE45465E

(19) United States
(12) Reissued Patent
Toyokawa et al.

(10) Patent Number: US RE45,465 E
(45) Date of Reissued Patent: Apr. 14, 2015

(54) COMMUNICATION SYSTEM USING NETWORK BASE IP MOBILITY PROTOCOL, CONTROL APPARATUS, ROUTER AND COMMUNICATION METHOD THEREOF

(71) Applicant: Sharp Kabushiki Kaisha, Osaka-shi, Osaka (JP)

(72) Inventors: Suguru Toyokawa, Tokyo (JP); Masafumi Aramoto, Tokyo (JP)

(73) Assignee: Sharp Kabushiki Kaisha, Osaka (JP)

(21) Appl. No.: 13/933,081

(22) Filed: Jul. 1, 2013

Related U.S. Patent Documents

Reissue of:
(64) Patent No.: 8,325,677
Issued: Dec. 4, 2012
Appl. No.: 12/512,525
Filed: Jul. 30, 2009

U.S. Applications:
(63) Continuation of application No. 12/440,181, filed as application No. PCT/JP2007/067016 on Aug. 31, 2007, now Pat. No. 8,325,677.

(30) Foreign Application Priority Data

Sep. 6, 2006 (JP) ..... 2006-241684
Sep. 11, 2006 (JP) ..... 2006-245719

(51) Int. Cl.
*H04W 4/00* (2009.01)
*H04W 36/24* (2009.01)

(52) U.S. Cl.
CPC ..... *H04W 36/24* (2013.01)

(58) Field of Classification Search
CPC ..... H04W 80/04; H04W 84/12; H04W 88/06; H04W 88/08; H04W 84/18; H04W 72/04; H04W 76/00; H04W 36/18; H04W 36/0011; H04W 36/14; H04W 36/08; H04W 36/30; H04W 36/24
USPC ..... 370/328, 329, 330, 331, 332, 333
See application file for complete search history.

(56) References Cited

U.S. PATENT DOCUMENTS 7,519,367 B2 4/2009 Igarashi et al.
2003/0018810 A1* 1/2003 Karagiannis et al. ..... 709/238
(Continued)

FOREIGN PATENT DOCUMENTS

EP 1 720 363 8/2006
JP 8-186605 A 7/1996
(Continued)

OTHER PUBLICATIONS

U.S. Office Action issued in U.S. Appl. No. 12/440,181 on Apr. 6, 2012.
(Continued)

*Primary Examiner* — Dady Chery
(74) *Attorney, Agent, or Firm* — Birch, Stewart, Kolasch & Birch, LLP

(57) ABSTRACT

There are provided a communication system, a control apparatus, a router, and communication method thereof, there are capable of eliminating loss in packets during a handover and effectively releasing a resource of a router in a network base IP mobility protocol in which a mobile mode is movable without mounting a special protocol. When an MN 1 as a mobile terminal is moved, a router at a movement destination, a mobile access gateway (MAG)b 3 that has received a router solicitation from the MN 1 sends a location registration to a control apparatus, a local mobility anchor (LMA) 4, and when the LMA 4 determines as a handover, the LMA 4 instructs a router at a movement source, an MAGa 2 or an MAGb 3 to transfer a buffer from the MAGa 2 to the MAGb 3.

12 Claims, 16 Drawing Sheets

(56) References Cited

U.S. PATENT DOCUMENTS

| | | | | |
|---|---|---|---|---|
| 2004/0063429 | A1 | 4/2004 | Igarashi et al. | |
| 2004/0117508 | A1 | 6/2004 | Shimizu | |
| 2005/0007994 | A1 | 1/2005 | Fukuzawa et al. | |
| 2005/0088994 | A1 | 4/2005 | Maenpaa et al. | |
| 2007/0072608 | A1* | 3/2007 | Funabiki et al. | 455/436 |
| 2007/0171875 | A1 | 7/2007 | Suda | |
| 2007/0211664 | A1 | 9/2007 | Oyama et al. | |
| 2007/0217363 | A1 | 9/2007 | Ue et al. | |
| 2008/0232324 | A1 | 9/2008 | Tajima et al. | |

FOREIGN PATENT DOCUMENTS

| | | | |
|---|---|---|---|
| JP | 2942162 | B2 | 8/1999 |
| JP | 2001-339752 | A | 12/2001 |
| JP | 2003-87841 | A | 3/2003 |
| JP | 2004-128636 | A | 4/2004 |
| JP | 2004-222156 | A | 8/2004 |
| JP | 2005-12718 | A | 1/2005 |
| JP | 2007-251249 | A | 9/2007 |
| WO | WO 02/077820 | | 10/2002 |
| WO | WO 2005/081428 | A1 | 1/2005 |
| WO | WO 2005/081560 | | 9/2005 |
| WO | WO 2007/074514 | A1 | 7/2007 |

OTHER PUBLICATIONS

U.S. Office Action issued in U.S. Appl. No. 12/440,181 on Oct. 13, 2011.

U.S. Office Action issued in U.S. Appl. No. 12/440,181 on Sep. 14, 2012.

D. Johnson et al., "Mobility Support in IPv6", Network Working Group, Request for Comments, 2004, The Internet Society.

R. Koodli, "Fast Handovers for Mobile IPv6", Network Working Group, Request for Comments, 2005, The Internet Society.

G. Giaretta et al., "NetLMM Protocol draft-giaretta-netlmm-dt-protocol-00.txt", NETLMM, Internet-Draft, Jun. 19, 2006.

* cited by examiner

| | Link local address | Global address |
|---|---|---|
| MAGa | IP_LINK_MAGa | IP_GLOBAL_MAGa |
| MAGb | IP_LINK_MAGb | IP_GLOBAL_MAGb |
| LMA | IP_LINK_LMAa | IP_GLOBAL_LMAa |
| MNa | IP_LINK_MNa | IP_GLOBAL_MNa |
| MNb | IP_LINK_MNb | IP_GLOBAL_MNb |

COMMUNICATION SYSTEM USING NETWORK BASE IP MOBILITY PROTOCOL, CONTROL APPARATUS, ROUTER AND COMMUNICATION METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE

This application is a *reissue of application Ser. No. 12/512,525 filed on Jul. 30, 2009 now U.S. Pat. No. 8,325,677 issued on Dec. 4, 2012, which is a* Continuation of [pending] U.S. application Ser. No. 12/440,181, filed on Mar. 5, 2009, which is the national phase of Japanese Application 2007/067016 filed on Aug. 31, 2007, which designated the United States and which claims priority to Japanese Application 2006-241684 filed on Sep. 6, 2006 and Japanese Application 2006-245719 filed on Sep. 11, 2006. The entire contents of the above applications are hereby incorporated by reference.

TECHNICAL FIELD

The present invention relates to a communication technology using a network base IP mobility protocol.

BACKGROUND ART

In recent years, a lot of research and development have been made on a mobility support in an IP layer such as Mobile IPv6 (Internet Protocol version6). The Mobile IP is a protocol of a network layer which is a third layer of the OSI (Open Systems Interconnection) Basic Reference Model established by the ISO (International Organization for Standardization), and is a technology for hiding movement of a client (switch of a network/communication medium, short break and the like) from higher-order applications so as to continue communication.

In TCP/IP (Transmission Control Protocol/Internet Protocol) which is a communication protocol generally used in the current internet generally, an IP address serves as an identifier and also shows a location on a network at the same time. Therefore, when a node connected to a certain network is reconnected to another network, an IP address thereof is changed and session is impossible to continue.

Hence, the Mobile IP provides a mechanism in which a unique address is assigned to a node and replaced with an IP address actually used in a TCP/IP stack, thereby it seems for upper layers or a communication partner that communication is performed with the assigned unique address in any network (for example, see Non-Patent Literature 1).

The Mobile IP is configured by nodes called a mobile node (Mobile Node, a mobile terminal, hereinafter, referred to as "MN"), a home agent (Home Agent, hereinafter, referred to as "HA"), and a correspondent node (Correspondent Node, a correspondent node, hereinafter, referred to as "CN").

The MN has an always invariable address called a home address (Home Address, hereinafter, referred to as "HoA"), and a node that manages the address is the HA. When the MN is connected to a network other than a home link which is a link of the HA, an address actually used for communication that is called a care-of address (Care-of-Address, a care-of address, hereinafter, referred to as "CoA") is acquired by some sort of means of, for example, a router advertisement (Router Advertisement, hereinafter, referred to as "RA") of a stateless address auto-configuration, or a DHCP (Dynamic Host Configuration Protocol) v6 of a stateful address auto-configuration. The MN notifies the HA of the CoA acquired here with a message of Binding Update (Binding Update, hereinafter, referred to as "BU").

As a result, when a node (=CN) to be desirably communicated with the MN sends a packet to the HoA, the HoA is an address of a link managed by the HA and is therefore temporally delivered to the HA. At that time, the HA transfers to the CoA associated with the HoA. As a result, the MN becomes always communicable by the HoA. In the MN, an application running on the MN always uses an IP address called the HoA above to communicate.

The CoA is used for a source address or a destination address of an actual IPv6 packet. Further, in order to hide movement from higher-order applications, technologies such as an IPv6 in IPv6 encapsulation and a mobility header are used. As a result, the HoA is notified to the application to hide an IPv6 address (CoA) actually used.

However, since this mobile IPv6 is incapable of performing a high-speed handover, FMIPv6 (Fast Handovers for Mobile IPv6) has been proposed (for example, see Non-Patent Literature 2).

With reference to FIG. 21 as an example, the FMIPv6 will be described.

An RtSolPr (Router Solicitation for Proxy Advertisement, a router solicitation proxy, hereinafter, referred to as "RtSolPr") at S1201 in FIG. 21 is one in which a router solicitation (a router request) is extended for the FMIPv6, said router solicitation being a message sent by a host generally used in the IPv6 to a router to generate a router notification. The MN sends the RtSolPr to a PAR (Previous Access Router, an access router in communication, hereinafter, referred to as "PAR").

Upon receipt of the RtSolPr from the MN, the PAR sends a PrRtAdv (Proxy Router Advertisement, a proxy router advertisement, Hereinafter, referred to as "PrRtAdv") to the MN at S1202. The PrRtAdv is one in which an RA generally used in the IPv6 is extended for the FMIPv6.

Upon receipt of the PrRtAdv from the PAR, the MN sends an FBU (Fast Binding Update) that is a binding update for a high-speed handover to the PAR at S1203. The FBU includes NCoA (New Care of address, a new CoA, hereinafter, referred to as "NCoA") information, and since the NCoA is an address belonging to a link of an NAR (New Access Router, an access router at a movement destination, hereinafter referred to as "NAR"), the PAR is capable of transferring a packet to the NAR.

Upon receipt of the FBU from the MN, the PAR sends an HI (Handover Initiate, hereinafter, referred to as "HI") to the NAR to switch the MN and initialize a handover at 1204. The NAR sends, as confirmation for the HI, an HAck (Handover Acknowledgement, hereinafter, referred to as "HAck") to the PAR at S1205, and packet transfer is started between the PAR and the NAR at S1206.

In addition, when the movement is finished and movement is completed to be under the control of the NAR (the same link), the MN sends an FNA (Fast Neighbor Advertisement, a high-speed neighbor advertisement, hereinafter, referred to as "FNA") to the NAR at S1207. This is to notify the NAR of that the movement is completed. As a result, the NAR starts delivery of the packet to the MN at S1208.

In this method, it is stated that a tunnel between the PAR and the NAR in transition is created at the time of the handover, but a means for returning from a state in transition to a normal state is not mentioned.

The Mobile IP above performs mobility management by signaling driver from the mobile-terminal-side and is therefore called a mobility protocol on a host base. On the other hand, the IETF (Internet Engineering Task Force) has further proposed a network base IP mobility protocol, in which signaling for movement control is performed in the network side and the MN is capable of moving without a specific protocol for movement to be mounted (for example, see Non-Patent Literature 3).

This has such various advantages that the MN is not required to handle the CoA, an overhead due to a packet encapsulation or a mobility header is eliminated, and the like. A method for a handover of the network base IP mobility protocol will be described with reference to FIG. 22.

First, after the movement, at S1301, the MN sends an RS (Router Solicitation, a router request, hereinafter, referred to as "RS") or a network configuration (network setting) request message such as a DHCP Request to a router of a link at a movement destination described as "NewMAG" in FIG. 22, a mobile access gateway (Mobile Access Gateway, hereinafter, referred to as "MAG").

The MAG refers to a router that performs relaying between the MN moving to the link and a route router serving as a control apparatus for controlling an IP mobility, a local mobility anchor (Local Mobility Anchor, hereinafter, referred to as "LMA").

The LMA controls a plurality of MAGs connected by a network. The LMA manages identifiers of the MN and MAG and IP addresses in a storage portion.

The MAG also manages identifiers of the MN and LMA and IP addresses in a storage portion. The information managed by the MAG can be acquired by performing communication with the LMA.

By performing IPv6 in IPv6 encapsulation of a packet and adding a header with reference to information stored in the storage portion, tunneling is performed between the MAG and the LMA so that routing can be performed properly.

In the network as described above, the MN sends, here, for example, the RS to the MAG in the same link at a movement destination. Upon receipt of the RS from the MN, the MAG (NewMAG) sends a location registration (location registration request) to the LMA at S1302.

Upon receipt of the location registration, the LMA detects as a handover, and, at S1303, sends a routing set-up to the MAG (NewMAG) and sets a tunnel path between the NewMAG and the LMA.

Setting of the tunnel path means to set so that a packet for the MN is encapsulated in the LMA, sent to the MAG (NewMAG), decapsulated in the MAG, and then transferred to the MN.

Upon receipt of the routing set-up, the MAG (NewMAG) sends a routing set-up Ack for confirmation to the LMA at S1304.

Further, upon receipt of the location registration from the MAG (NewMAG), the LMA sends a location registration Ack for confirmation to the MAG (NewMAG) at S1305.

At S1306, the MAG (NewMAG) sends an RA to the MN and the MN performs an address configuration (address setting).

Thereafter, at S1307, the MN performs a DAD (Duplicate Address Detection, a duplicate address detection, hereinafter, referred to as "DAD") with respect to the MAG (NewMAG) using an NA (Neighbor Advertisement, a neighbor advertisement, hereinafter, referred to as "NA"), and confirms that the address is single to complete the address configuration. Further, the MAG (NewMAG) sends an MN address set-up to the LMA at S1308, and the LMA sends an MN address set-up Ack to the MAG (NewMAG) at S1309.

As a result that the tunnel path is set between the LMA and the MAG and the address configuration in the MN is completed, the packet is reachable to the MN. This is a method for the handover of the network base IP mobility protocol. That is, since a packet addressed to the MN is sent through the LMA, by completing a tunnel between the LMA and the MAG, routing to the MN is possible.

Non-Patent Literature 1: Request for Comments (RFC) 3775, "Mobility Support in IPv6"

Non-Patent Literature 2: Request for Comments (RFC) 4068, "Fast Handovers for Mobile IPv6"

Non-Patent Literature 3: Internet Draft "draft-giaretta-netlmm-dt-protocol"

DISCLOSURE OF INVENTION

Problems to be Solved by the Invention

However, in a conventional network base IP mobility protocol, there is a possibility that packets during a handover are lost, thus a fast handover is impossible. This will be described with reference to FIG. 23.

As shown in FIG. 23, packets delivered to an LMA in a period from a time when an MN disconnects connection with a router (PreMAG) in a link at a movement source ((1) in FIG. 1) and starts connection with a NewMAG to a time a result thereof is delivered to the LMA as a location registration ((2) in FIG. 2) can not be held in the LMA and are surely delivered to the PreMAG. That is, the packets delivered to the PreMAG have to be discarded after waiting until a fixed time has elapsed.

Further, the method using the FMIPv6 and the like described in FIG. 21 describe that a tunnel between a PAR and an NAR is created at the time of a handover but does not describe about deletion, thus a router has to hold the tunnel endlessly when there is no timer. As a result, there is a possibility that a resource in the router is lost.

The present invention has been made in view of the above problems, it is therefore an object of the present invention to provide a communication system, a control apparatus, a router, and communication method thereof, that are capable of eliminating loss in packets during a handover and effectively releasing a resource of a router in a network base IP mobility protocol in which a mobile terminal is movable without mounting a special protocol.

Means for Solving the Problems

In view of such circumstances, a communication system using a network base IP mobility protocol according to the first aspect of the present invention, in which, using the network base IP mobility protocol, a mobile terminal sends and receives data from a router belonging in a same link with a uniquely applied address to perform communication, and when the mobile terminal moves to another network, communication is switched by control of a control apparatus, is characterized in that the router in a network at a movement destination of the mobile terminal receives a notification including an identifier of the mobile terminal from the mobile terminal and sends a notification including the identifier of the mobile terminal and an identifier of the router to the control apparatus, and the control apparatus sends a transfer instruction notification to the router at a movement source or the movement destination of the mobile terminal so that data is transferred from the router at the movement source to the router at the movement destination.

Further, a communication system using the network base IP mobility protocol according to the second aspect of the present invention is characterized in that the router at the movement destination sends the identifier of the mobile terminal to an information management apparatus that performs an authentication and receives information including address setting information of the mobile terminal and the control apparatus from the information management apparatus.

Further, a communication system using the network base IP mobility protocol according to the third aspect of the present invention is characterized in that, when the mobile terminal is moved, data is sent from the control apparatus through the router at the movement source and the router at the movement destination to the mobile terminal, and after communication of the control apparatus and the router at the movement destination and communication of the router at the movement destination and the mobile terminal are established, data is sent from the control apparatus only through the router at the movement destination to the mobile terminal.

Further, a communication system using the network base IP mobility protocol according to the fourth aspect of the present invention is characterized in that, when the router at the movement source has received data addressed to the mobile terminal from another router by transfer, the control apparatus sends a transfer cancel instruction notification for instructing cancel of setting for the transfer.

Further, a communication system using the network base IP mobility protocol according to the fifth aspect of the present invention is characterized in that, when it is detected that there is no data in a buffer for transferring with respect to the mobile terminal, the router at the movement source sends a transfer cancel instruction notification for canceling transfer setting to the router at the movement destination.

Further, a communication system using the network base IP mobility protocol according to the sixth aspect of the present invention is characterized in that, when a communication termination notification is received from the mobile terminal or when an abnormal communication termination of the mobile terminal is detected, the router at the movement destination sends a transfer cancel instruction notification for canceling transfer setting to the router at the movement source.

Further, a control apparatus according to the seventh aspect of the present invention in a system where, using a network base IP mobility protocol, a mobile terminal sends and receives data from a router belonging in a same link with a uniquely applied address to perform communication, that performs control to switch communication when the mobile terminal moves to another network, including a communication means for receiving a notification including an identifier of the mobile terminal and an identifier of the router from the router in a network at a movement destination of the mobile terminal; a storage means for holding communication information of the router that performs relaying and the mobile terminal; and a control means for referring to the storage means with respect to communication information of the mobile terminal from the identifier of the mobile terminal included in the notification from the router and updating information of the router at the movement destination to generate a transfer instruction notification for instructing transfer of data from the router at the movement source to the router at the movement destination, and is characterized in that the communication means sends the transfer instruction notification to the router at the movement source or the movement destination of the mobile terminal.

Further, a control apparatus according to the eighth aspect of the present invention is characterized in that the control means extracts an identifier of the router at the movement source of the mobile terminal from the identifier of the mobile terminal included in the notification from the router at the movement destination by the storage means, and the transfer instruction notification to the router at the movement source or the movement destination includes the identifier of the router at the movement destination or the identifier of the router at the movement source, and the identifier of the mobile terminal.

Further, a control apparatus according to the ninth aspect of the present invention is characterized in that the control means generates a deletion instruction notification for instructing to the router at the movement source to delete communication information of the router and the control apparatus concerning the mobile terminal and sends it to the router at the movement source through the communication means.

Further, a control apparatus according to the tenth aspect of the present invention is characterized in that the control means synthesizes the deletion instruction notification and the transfer instruction notification and sends to the router at the movement source through the communication means.

Further, a control apparatus according to the eleventh aspect of the present invention is characterized in that, after communication of the control apparatus and the router at the movement destination and communication of the router at the movement destination and the mobile terminal are established, the control means sends data to the router at the movement destination.

Further, a control apparatus according to the twelfth aspect of the present invention is characterized in that, when the router at the movement source has received data addressed to the mobile terminal from another router by transfer, the control means generates a transfer setting cancel notification including the identifier of the mobile terminal and the identifier of the another router to delete setting for the transfer, and the communication means sends the transfer instruction notification to the router at the movement source and further sends the transfer setting cancel notification to the router at the movement source.

Further, a control apparatus according to the thirteenth aspect of the present invention is characterized in that, when the router at the movement source has received data addressed to the mobile terminal from another router by transfer, the control means generates a transfer setting cancel notification including the identifier of the mobile terminal and the identifier of the another router to delete setting for the transfer, and the communication means sends the transfer instruction notification to the router at the movement source and further sends the transfer setting cancel notification to the router at the movement source.

Further, a control apparatus according to the fourteenth aspect of the present invention is characterized in that the control means synthesizes the transfer instruction notification and the transfer setting cancel notification and sends to the router at the movement source.

Further, a control apparatus according to the fifteenth aspect of the present invention is characterized in that the control means synthesizes the transfer instruction notification and the transfer setting cancel notification and sends to the router at the movement source.

Further, a control apparatus according to the sixteenth aspect of the present invention is characterized in that the control means synthesizes a notification for instructing cancel of communication with the control apparatus and the transfer setting cancel notification and sends to the router at the movement source.

Further, a control apparatus according to the seventeenth aspect of the present invention is characterized in that the control means synthesizes a notification for instructing cancel of communication with the control apparatus and the transfer setting cancel notification and sends to the router at the movement source.

Further, a router according to the eighteenth aspect of the present invention that uses a network base IP mobility protocol to perform transmission and reception of data to and from a mobile terminal belonging in a same link that performs communication with a uniquely applied address by control of a control apparatus, including: a communication means for receiving a notification from a mobile terminal that has moved; and a control means for generating a notification including an identifier of the mobile terminal and an identifier of the router to be sent to the control apparatus; and is characterized in that the communication means sends the notification to the control apparatus, and the control means transfers data received from the router at a movement source to the mobile terminal by a transfer instruction notification from the control apparatus or a notification from the router at the movement source.

Further, a router according to the nineteenth aspect of the present invention is characterized in that, when a transfer instruction notification of the mobile terminal that has moved to another network is received from the control apparatus, the control means transfers data addressed to the mobile terminal to the router at the movement destination.

Further, a router according to the twentieth aspect of the present invention is characterized in that the control means transfers data addressed to the mobile terminal with an address of the router at the movement destination added as a header.

Further, a router according to the twenty-first aspect of the present invention is characterized in that the communication means sends the received identifier of the mobile terminal to an information management apparatus that performs an authentication and receives information including address setting information of the mobile terminal and the control apparatus from the information management apparatus.

Further, a router according to the twenty-second aspect of the present invention further including a storage means for holding communication information of the mobile terminal, and is characterized in that, when a deletion instruction notification is received from the control apparatus, the control means deletes communication information of the router and the control apparatus concerning the mobile terminal from the storage means.

Further, a router according to the twenty-third aspect of the present invention is characterized in that by a notification from the control apparatus that has received, by transfer, data addressed to the mobile terminal from another router to instruct cancel of transfer setting, the control means sends a transfer setting cancel notification including the identifier of the mobile terminal and the identifier of the router to the another router.

Further, a router according to the twenty-fourth aspect of the present invention is characterized in that the communication means receives the transfer instruction notification from the control apparatus with which the transfer setting cancel notification is synthesized.

Further, a router according to the twenty-fifth aspect of the present invention is characterized in that the communication means receives a notification for instructing cancel of communication with the control apparatus from the control apparatus with which the transfer setting cancel notification is synthesized.

Further, a router according to the twenty-sixth aspect of the present invention is characterized in that, when it is detected that there is no data in a buffer to be transferred with respect to the mobile terminal, the control means sends a notification for canceling transfer setting to the router at the movement destination.

Further, a router according to the twenty-seventh aspect of the present invention is characterized in that, when a communication termination notification is received from the mobile terminal or when an abnormal communication termination of the mobile terminal is detected, the control means sends a notification for canceling transfer setting to the router at the movement destination.

Further, a communication method according to the twenty-eighth aspect of the present invention that, using a network base IP mobility protocol, causes a mobile terminal to send and receive data from a router belonging in a same link with a uniquely applied address, and when the mobile terminal moves to another network, causes a control apparatus to perform control to switch communication of the mobile terminal, and is characterized in that the mobile terminal is caused to execute: a step of generating a notification including an identifier of the mobile terminal; and a step of sending the notification to the router at a movement destination; the router at the movement destination is caused to execute: a step of generating a notification including the identifier of the mobile terminal and an identifier of the router; and a step of sending the notification to the control apparatus; and the control apparatus is caused to execute: a step of generating a transfer instruction notification for instructing transfer of data from the router at a movement source to the router at the movement destination; and a step of sending the transfer instruction notification to the router at the movement source or the movement destination.

Further, a communication method according to the twenty-ninth aspect of the present invention is characterized in that the router at the movement destination is caused to send the identifier of the mobile terminal to an information management apparatus that performs an authentication, and the router at the movement destination receives information including address setting information of the mobile terminal and the control apparatus from the information management apparatus.

Further, a communication method according to the thirtieth aspect of the present invention, when the mobile terminal is moved, the control apparatus is caused to send data through the router at the movement source and the router at the movement destination to the mobile terminal, and after communication of the control apparatus and the router at the movement destination and communication of the router at the movement destination and the mobile terminal are established, the control apparatus is caused to send data only through the router at the movement destination to the mobile terminal.

Further, a communication method according to the thirty-first aspect of the present invention, when the router at the movement source has received by transfer data addressed to the mobile terminal from another router, the control apparatus is caused to send to the router at the movement source a transfer cancel instruction notification for instructing cancel of setting for the transfer.

Advantages of the Invention

According to the present invention, in a network base IP mobility protocol, with control by a control apparatus, by generating a tunnel from a router at a movement source to a router at a movement destination and performing transfer of data, it is possible to eliminate loss in packets during a handover.

Further, when a tunnel between new routers is generated, if there is no buffer in a router in a link at a movement source, with a timing at which transfer between routers is not required at the time of termination of communication or at the time of abnormal termination of communication as a trigger, the tunnel between the routers is deleted, so that a resource of the router can be released effectively.

Further, a control apparatus synthesizes a transfer instruction notification of buffer of packets addressed to the mobile terminal and a deletion instruction notification for instructing deletion of communication setting between the control apparatus and the router at the movement source and sends it to the router at the movement source, thus making is possible to perform processing of buffer transfer and deletion of tunnel setting between the control apparatus and the router at the movement source smoothly.

Further, the control apparatus synthesizes a transfer instruction notification of a buffer of packets addressed to a mobile terminal and a deletion instruction notification for instructing deletion of unnecessary communication setting between the router at the movement source and another router and sends it to the router at the movement source, thus making it possible to perform processing of buffer transfer and deletion of unnecessary tunnel setting between routers smoothly.

Further, the control apparatus synthesizes a deletion instruction notification for instructing deletion of communication setting between the control apparatus and the router at the movement source and a deletion instruction notification for instructing deletion of unnecessary communication setting between the router at the movement source and another router and sends it to the router at the movement source, thus making it possible to perform processing of deletion of tunnel setting between the control apparatus and the router at the movement source and deletion of unnecessary tunnel setting between routers smoothly.

Further, when a Proxy Mobile IP system is applied and a router acquires information including address setting information of a mobile terminal and a control apparatus from an information management apparatus (server), actions/advantages according to the present invention are the same.

DESCRIPTION OF REFERENCE NUMERALS

Figure 1:
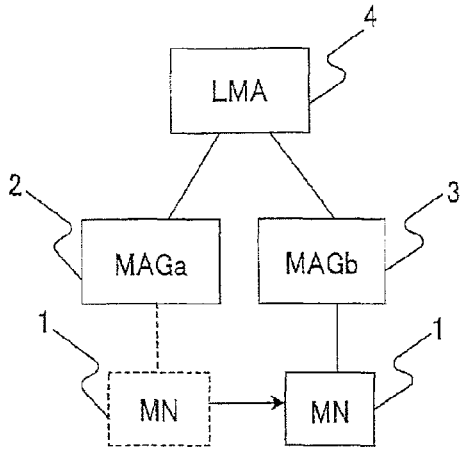
FIG. 1 is a view illustrating the schematic structure of a network in a first embodiment.

1, 21, 22, 31 mobile node
25 2, 3 mobile access gateway
4 local mobility anchor
5 MN communication means
6, 10 Netlmm communication means
7, 12 Netlmm control means
8, 13 storage portion
9 temporal storage portion
11 external network communication means
41 AAA server
42 network

BEST MODE FOR CARRYING OUT THE INVENTION

Hereinafter, embodiments of the present invention will be described with reference to the examples shown in the drawings.

An MN and an MAG generally have wireless communication means, and description in all of the embodiments will be given mainly in view of a handover by wireless communication, but use by wired communication is also possible and communication means is not particularly limited, thus detailed description for the communication means will be omitted.

First Embodiment

FIG. 1 is a view illustrating the schematic structure of a network in the present embodiment.

Figure 2:
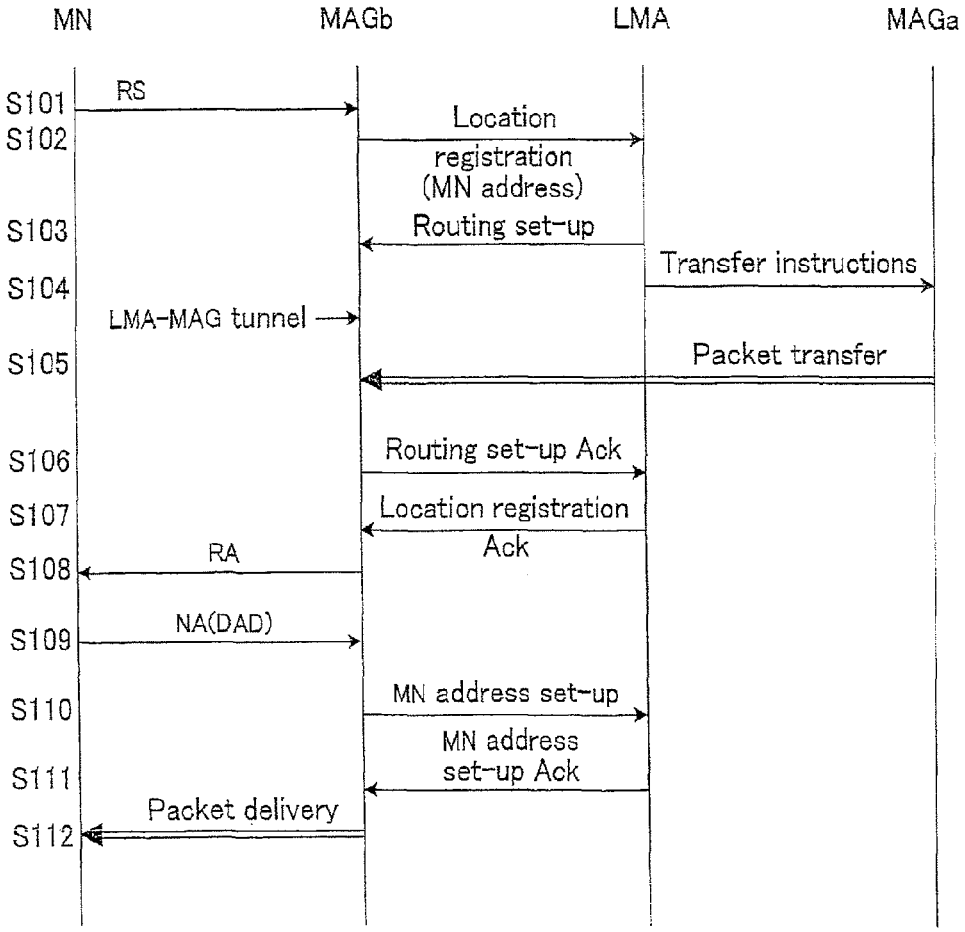
FIG. 2 is a sequence diagram illustrating processing procedures in the first embodiment.

FIG. 2 is a sequence diagram illustrating processing procedures in the present embodiment.

Figure 3:
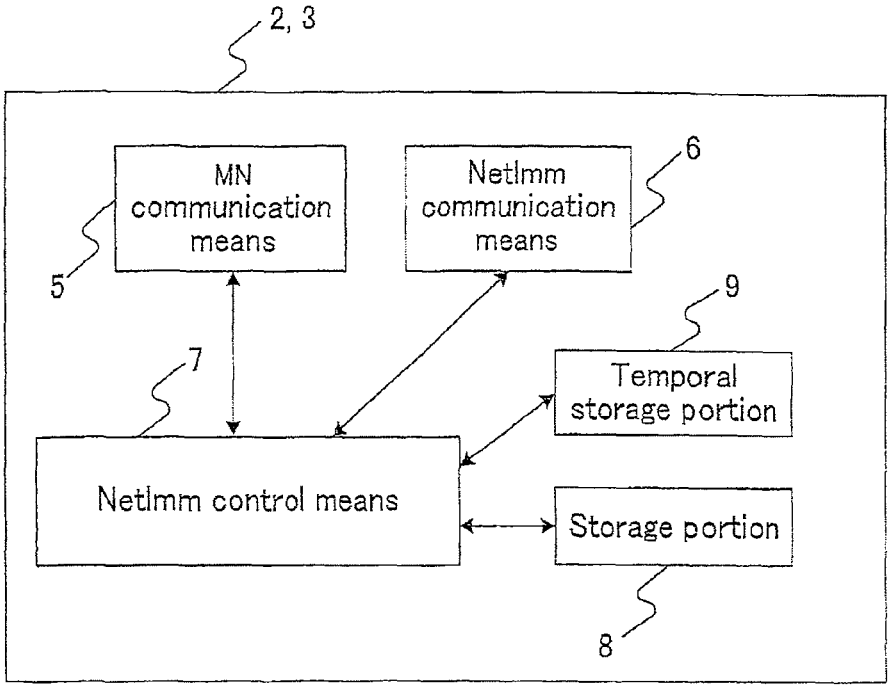
FIG. 3 is a block diagram illustrating the structure of an MAG in the present invention.

FIG. 3 is a block diagram illustrating the structure of an MAG in the present embodiment.

Figure 4:
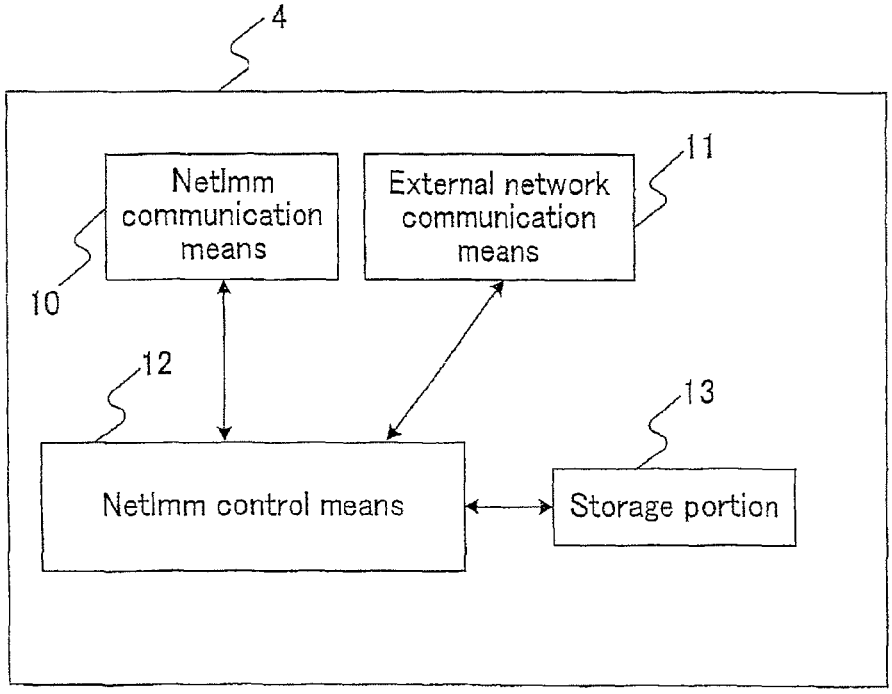
FIG. 4 is a block diagram illustrating the structure of an LMA in the present invention.

FIG. 4 is a block diagram illustrating the structure of an LMA in the present embodiment.

In the present embodiment, as shown in FIG. 1, description will be given for an example where an MN 1 moves from a link of an MAGa 2 to a link of an MAGb 3, and control for communication is performed by an LMA 4.

As shown in FIG. 3, the MAGs 2 and 3 are configured by including an MN communication means 5 for performing communication with the MN 1, an Netlmm communication means 6 for performing communication with another MAG or the LMA 4, an Netlmm control means 7 for performing control by a network base IP mobility protocol according to the present invention, a storage portion 8 for storing information and the like with respect to communication, and a temporal storage portion 9 for storing a buffer addressed to the MN.

As shown in FIG. 4, the LMA 4 is configured by including an Netlmm communication means 10 for performing communication with the MAGs 2 and 3, an external network communication means 11 for performing communication with an external network, an Netlmm control means 12 for performing control by a network base IP mobility protocol according to the present invention, and a storage portion 13 for storing information and the like with respect to communication.

First, as shown in FIG. 2, the MN 1 sends an RS including at least an MN-ID as an identifier of the MN 1 to the MAGb 3 or a link local multicast address at S101.

The Netlmm control means 7 of the MAGb 3 that has received the RS from the MN communication means 5 stores the MN-ID in the storage portion 8, as well as, at S102, generates a location registration including at least the MN-ID and an MAGb-ID as an identifier of the MAGb 3, and sends it from the Netlmm communication means 6 to the LMA 4.

The Netlmm control means 12 of the LMA 4 that has received the location registration from the Netlmm communication means 10 searches a current state of the MN 1 from data held in the storage portion 13 of the LMA 4 with the MN-ID as a key and grasps that the MN 1 is in a state of belonging to the MAGa 2 currently in the data. The Netlmm control means 12 of the LMA 4 recognizes that the MN 1 is in the state of belonging to the MAGa 2 currently in the data, but when the location registration has come from the MAGb 3, the MN 1 was moved.

Hence, at S103, the Netlmm control means 12 of the LMA 4 generates a routing set-up (routing setting instructions) including at least an LMA-ID as an identifier of the LMA 4 and a global address of the MN 1 and sends it from the Netlmm communication means 10 to the MAGb 3. Further, at S104, the Netlmm control means 12 of the LMA 4 sends a transfer instruction notification including at least the MAGb-ID of the MAGb 3 and the MN-ID of the MN 1 to the MAGa 2.

The Netlmm control means 7 of the MAGa 2 that has received the transfer instruction notification starts transfer of packets addressed to an address of the MN 1 identified in the MN-ID to an IP address of the MAGb 3 identified in the MAGb-ID at S105. This transfer setting is performed by update of a routing table in the storage portion 8 of the MAGa 2. That is, the packets addressed to the MN 1 have been associated with a link local address of the MN 1 in the routing table of the MAGa 2 until now. The setting in the routing table is updated so that the packets addressed to the MN 1 are transferred to the MAGb 3.

The transfer to the MAGb 3 is realized by setting so that a next hop of the packets addressed to the MN 1 is transferred to any one of a link local address of the MAGb 3, a global address of the MAGb 3, a higher-order router address of the MAGb 3, and a higher-order router address of the MAGa2.

The Netlmm control means 7 of the MAGb 3 that has received the routing set-up from the LMA 4 sets a tunnel path between the LMA 4 and the MAGb 3, and sends a routing set-up Ack (Acknowledgement) for confirmation to the LMA 4 at S106.

The Netlmm control means 12 of the LMA 4 that has received the routing set-up Ack from the MAGb 3 sends a location registration Ack including at least prefix information of the MN 1 to the MAGb 3 at S107.

The Netlmm control means 7 of the MAGb 3 that has received the location registration Ack sends an RA to the MN 1 based on the prefix information above at S108.

The MN 1 that has received the RA from the MAGb 3 sends an NA to a link in the DAD procedure at S109. The Netlmm control means 7 of the MAGb 3 receives the NA from the MN 1 and thereafter sends an MN address set-up including the MAGb-ID, the MN address and the MN-ID to the LMA 4 at S110, and the Netlmm control means 12 of the LMA 4 sends an MN address set-up Ack for conformation to the MAGb 3 at S111.

Subsequently, at S112, the Netlmm control means 7 of the MAGb 3 starts delivery of packets including transfer from the MAGa 2 to the MN 1.

Whereby, packets addressed to the MN 1 that have been stored in the buffer of the MAGa 2 from a time the MN 1 was cut from the MAGa 2 for movement until the location registration has reached to the LMA 4 are transferred through the MAGb 3, which allows communication without loss in packets.

Second Embodiment

Figure 5:
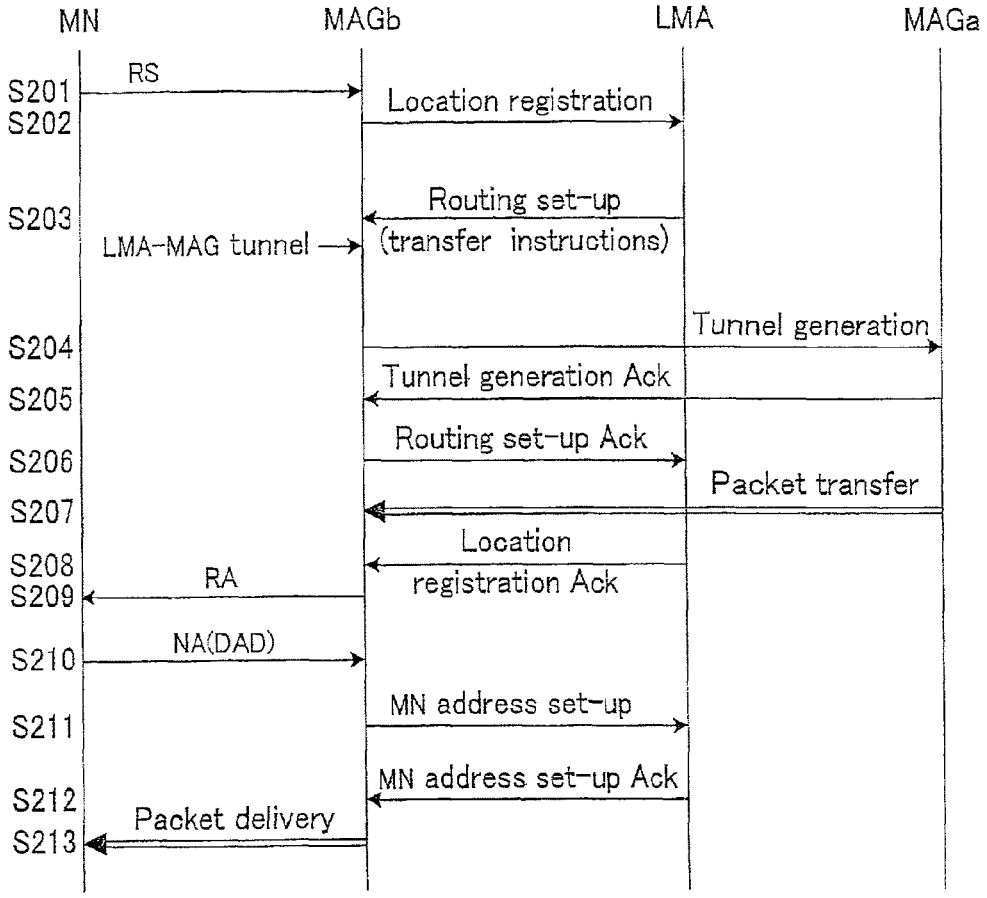
FIG. 5 is a sequence diagram illustrating processing procedures in a second embodiment.

FIG. 5 is a sequence diagram illustrating processing procedures in the present embodiment.

In the present embodiment, similarly to the first embodiment, the MN 1 moves from the link of the MAGa 2 to the link of the MAGb 3 as shown in FIG. 1.

A different point from the first embodiment is that while the LMA 4 sends the transfer instruction notification for the router MAGb 3 at a movement destination to the router MAGa 2 at a movement source in the first embodiment, the LMA 4 sends the transfer instruction notification to the MAGb 3 in the present embodiment.

First, as shown in FIG. 5, the MN 1 sends an RS including at least an MN-ID as an identifier of the MN 1 to the MAGb 3 or a link local multicast address at S201.

The Netlmm control means 7 of the MAGb 3 that has received the RS from the MN 1 sends a location registration including at least the MN-ID and an MAGb-ID as an identifier of the MAGb 3 to the LMA 4 at S202.

The Netlmm control means 12 of the LMA 4 that has received the location registration from the MAGb 3 searches a current state of the MN 1 from data held in the storage portion 13 of the LMA 4 with the MN-ID as a key and grasps that the MN 1 is in a state of belonging to the MAGa 2 currently in the data of the LMA 4. The Netlmm control means 12 of the LMA 4 recognizes that the MN 1 is in a state of belonging to the MAGa 2 currently in the data, but when the location registration has come from the MAGb 3, the MN 1 was moved.

Hence, at S203, the Netlmm control means 12 of the LMA 4 sends a routing set-up including at least an LMA-ID as an identifier of the LMA 4 and a global address of the MN 1 for generation of a tunnel between the LMA 4 and the MAGb 3 to the MAGb 3.

Further, at this time, the Netlmm control means 12 of the LMA 4 sends a transfer instruction notification including at least an MAGa-ID as an identifier of the MAGa 2 and the MN-ID of the MN 1 to the MAGb 3. The transfer instruction notification from the LMA 4 to the MAGb 3 may be sent in addition to a normal routing set-up.

The Netlmm control means 7 of the MAGb 3 that has received the transfer instruction notification from the LMA 4 sends a tunnel generation message including at least the MN-ID and the MAGb-ID of the MAGb to an IP address of the MAGa 2 grasped from the MAGa-ID of the MAGa 2 at S204.

The Netlmm control means 7 of the MAGa 2 that has received the tunnel generation message from the MAGb 3 sets a tunnel path with the MAGb 3 and, at S205, sends a tunnel generation Ack for confirmation to the MAGb 3 so that packets addressed to the MN 1 in the buffer of the MAGa 2 can be transferred to the MAGb 3. The tunnel path is realized by performing IPv6 in IPv6 encapsulation in which the IP address of the MAGb 3 serves as an external destination address and the IP address of the MAGa 2 serves as an external source address.

The Netlmm control means 7 of the MAGb 3 that has received the routing set-up sets a tunnel path between the LMA 4 and the MAGb 3 and sends a routing set-up Ack to the LMA 4 at S206.

Further, the Netlmm control means 7 of the MAGa 2 that has received the transfer instructions starts transfer of the packets addressed to the MN 1 identified in the MN-ID to the IP address of the MAGb 3 identified in the MAGb-ID at S207.

The Netlmm control means 12 of the LMA 4 that has received the routing set-up Ack from the MAGb 3 sends a location registration Ack including at least prefix information of the MN 1 to the MAGb 3 at S208.

The Netlmm control means 7 of the MAGb 3 that has received the location registration Ack from the LMA 4 sends an RA to the MN 1 based on the prefix information above at S209.

The MN 1 that has received the RA from the MAGb 3 sends an NA to the link in the DAD procedure at S210.

The Netlmm control means 7 of the MAGb 3 receives the NA from the MN 1 and thereafter sends an MN address set-up including the MAGb-ID, the MN address and the MN-ID to the LMA 4 at S211, and the Netlmm control means 12 of the LMA 4 sends an MN address set-up Ack for confirmation to the MAGb 3 at S212.

At S213, the Netlmm control means 7 of the MAGb 3 starts delivery of the packets addressed to the MN 1, including transfer from the MAGa 2.

In the present embodiment, description has been given for the case where the LMA 4 sends the transfer instructions to the MAGb 3 and tunneling is performed by an offer from the MAGB 3 to the MAGa 2. Whereby, the packets addressed to the MN 1 that have been stored in the buffer of the MAGa 2 are transferred through the MAGb 3, which can eliminate loss in packets during the handover.

Third Embodiment

Figure 6:
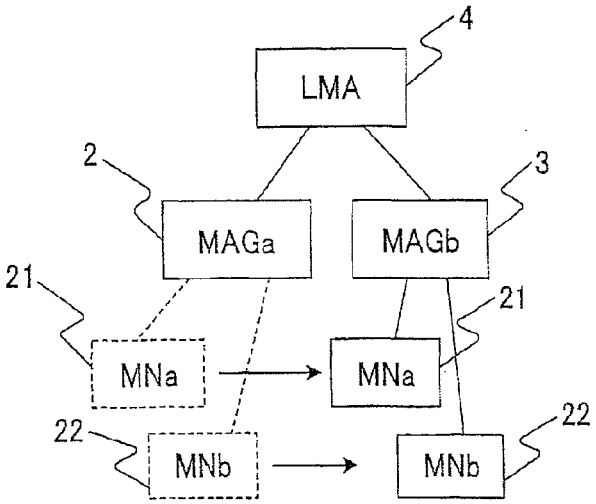
FIG. 6 is a view illustrating the schematic structure of a network in a third embodiment.

FIG. 6 is a view illustrating the schematic structure of a network in the present embodiment.

Figures 7, 8:
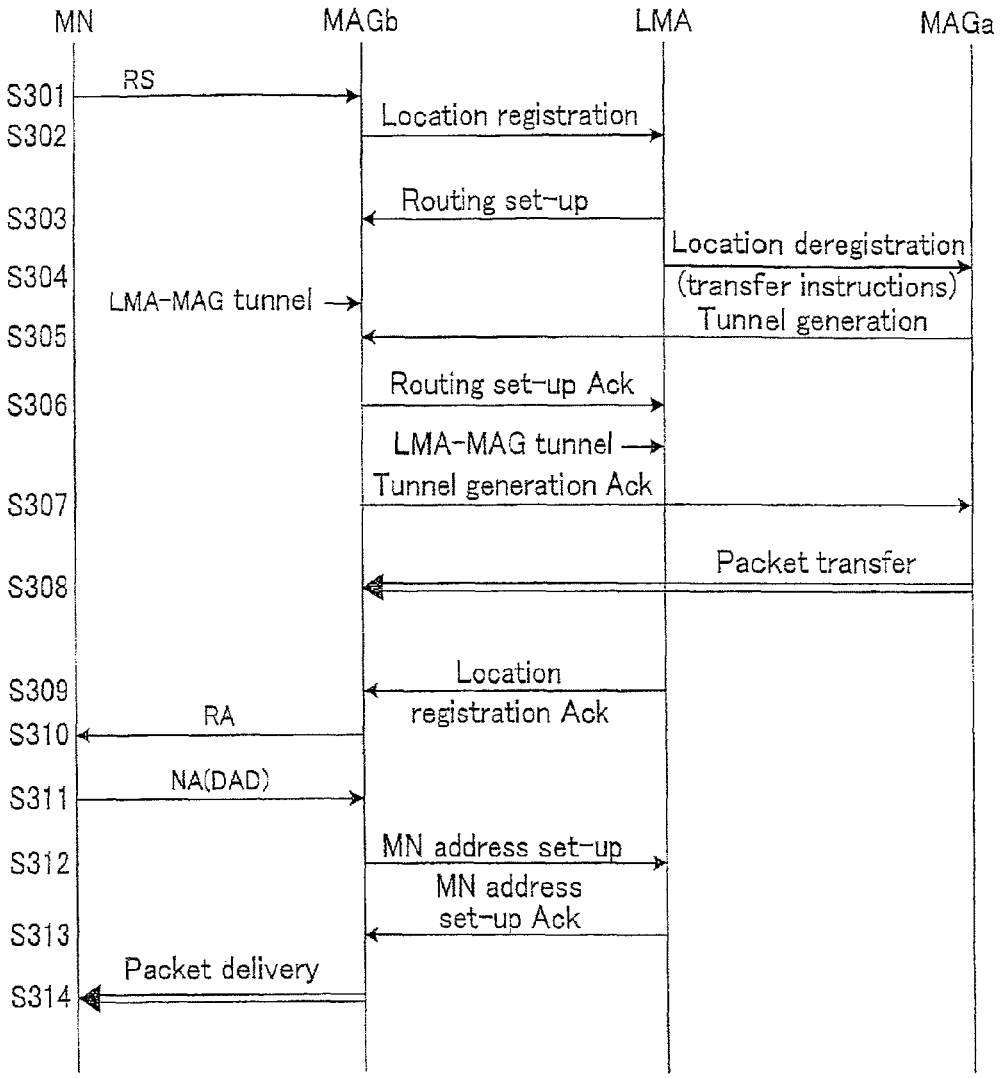
FIG. 7 is a sequence diagram illustrating processing procedures in the third embodiment.
FIG. 8 is a table illustrating addresses of each apparatus in the third embodiment.

FIG. 7 is a sequence diagram illustrating processing procedures in the present embodiment.

FIG. 8 is a table illustrating addresses of each apparatus in the present embodiment.

As shown in FIG. 6, an MNa 21 and an MNb 22 are under the control of the MAGa 2 at first. Description will be given for an example where in association with movement of the MNa 21 and the MNb 22, the MNa 21 and the MNb 22 move from under the control of the MAGa 2 to under the control of the MAGb 3.

In the present embodiment, description will be given for the case where when a plurality of MNs are moved and the case where transfer instructions to the MAGb 3 are caused to be included in a location deregistration for cancelling tunneling from the LMA 4 to the MAGa.

First, as shown in FIG. 7, at S301, the MNa 21 and the MNb 22 send an RS including at least an MNa-ID and an MNb-ID as identifiers of the MNa 21 and the MNb 22 to the MAGb 3 or a link local multicast address.

Here, for the MNa-ID and the MNb-ID, a link local address (IP_LINK_MNa, IP_LINK_MNb) and/or a global address (IP_GLOBAL_MNa, IP_GLOBAL_MNb) of the MNa 21 and the MNb 22 shown in FIG. 8 are used.

The Netlmm control means 7 of the MAGb 3 that has received the RS from the MNa 21 and the MNb 22 sends a location registration including at least the MNa-ID, the MNb-ID, and the MAGb-ID of the MAGb 3 to the LMA 4 (to IP_LINK_LMAa or IP_GLOBAL_LMAa) at S302. Here, for the MAGb-ID, a link local address (IP_LINK_MAGb) and/or a global address (IP_GLOBAL_MAGb) of the MAGb are used. This location registration may be sent individually to each of the MNa 21 and the MNb 22 or may be included in one message and sent to both of them.

The Netlmm control means 12 of the LMA 4 that has received the location registration from the MAGb 3 searches current states of the MNa 21 and the MNb 22 from data held in the storage portion 13 of the LMA 4 with the MNa-ID and the MNb-ID as keys and grasps that the MNa 21 and the MNb 22 are in a state of belonging to the MAGa 2 currently in the data of the LMA 4. The Netlmm control means 12 of the LMA 4 recognizes that the MNa 21 and the MNb 22 are in a state of belonging to the MAGa 2 currently in the data, but when the location registration has come from the MAGb 3, the MNa 21 and the MNb 22 were moved.

Hence, at S303, the Netlmm control means 12 of the LMA 4 sends a routing set-up to the MAGb 3.

Further, at this time, at S304, the Netlmm control means 12 of the LMA 4 sends a transfer instruction notification including at least the MAGb-ID of the MAGb 3 (IP_LINK_MAGb, and/or IP_GLOBAL_MAGb) and the MN-ID of the MNa 21 and the MNb 22 (IP_LINK_MNa and/or IP_GLOBAL_MNa, IP_LINK_MNb and/or IP_GLOBAL_MNb) to the MAGa 2. The transfer instruction notification may be performed individually to the MNa 21 and the MNb 22 or may be performed collectively. In addition, in order to delete the LMA-MAG tunnel path concerning the MNa 21 and the MNb 22, a location deregistration (a location deletion request) is sent to the MAGa 2. The transfer instruction notification to the MAGa 2 may be included in the location deregistration.

The Netlmm control means 7 of the MAGa 2 that has received the transfer instructions offers generation of a tunnel between the MAGa and the MAGb to the MAGb 3 in order to transfer packets addressed to addresses of the MNa 21 and the MNb 22 (whose destination address is IP_GLOBAL_MNa or IP_GLOBAL_MNb) identified in the MNa-ID and the MNb-ID to an IP address of the MAGb 3 identified in the MAGb-ID at S305.

The Netlmm control means 7 of the MAGb 3 that has received the routing set-up from the LMA 4 sets a tunnel path between the LMA 4 and the MAGb 3 and sends a routing set-up Ack to the LMA 4 at S306.

Further, the Netlmm control means 7 of the MAGb 3 that has received the tunnel generation request from the MAGa 2 returns a tunnel generation Ack to the MAGa 2 for confirmation at S307.

Upon receipt of the tunnel generation Ack of the MAGb 3, the Netlmm control means 7 of the MAGa 2 generates a tunnel between the MAGa and the MAGb. This tunnel is realized by performing IPV6 in IPv6 encapsulation in which the global address of the MAGb 3 (IP_GLOBAL_MAGb) serves as an external destination address and the global address of the MAGa 2 (IP_GLOBAL_MAGa) serves as an external source address. In the present invention, this tunnel serves as a tunnel though which packets addressed to the MNa 21 and MNb 22 (whose destination address is IP_GLOBAL_MNa or IP_GLOBAL_MNb) pass. In addition, between the MAGa and the MN, it is also possible to ensure completeness in a link technology. That is, it is possible that the MAGa 2 grasps unreached packets to the MNa 21 and/or the MNb 22 by using a technology of a second layer or lower of the OSI Basic Reference Model. The unreached packets MAGb 3 successively after the tunnel is created, at S308.

The Netlmm control means 12 of the LMA 4 that has received the routing set-up Ack from the MAGb 3 sends a location registration Ack including at least prefix information of the MN to the MAGb 3 at S309.

The Netlmm control means 7 of the MAGb 3 that has received the location registration Ack sends an RA to the MNa 21 and the MNb 22 based on the prefix information above at S310.

The MNa 21 and the MNb 22 that have received the RA from the MAGb 3 sends an NA to the link in the DAD procedure at S311.

The Netlmm control means 7 of the MAGb 3 receives the NA from the MNa 21 or the MNb 22 and thereafter sends an MN address set-up including the MAGb-ID, the MN address and the MN-ID to the LMA 4 at S312, the Netlmm control means 12 of the LMA 4 sends an MN address set-up Ack for conformation at S313, and the MAGb 3 starts delivery of packets addressed to the MNa 21 and the MNb 22 at S314.

In the present embodiment, description has been given for the case where a plurality of MNs are moved.

Also when there are a plurality of MNs, the packets addressed to the MNa 21 or the MNb 22 that have been stored in the buffer of the MAGa 2 are transferred through the MAGb 3, which can eliminate loss in packets due to the handover.

Further, by including transfer instructions to the MAGb 3 to which an ID of the MAGb 3 is added, in the location deregistration to be sent to the MAGa 2 for cancelling tunneling, it is possible to perform cancel of tunneling between the LMA and the MAGa 2 and setting of tunneling for transfer from the MAGa 2 to the MAGb 3 smoothly.

Fourth Embodiment

Figure 9:
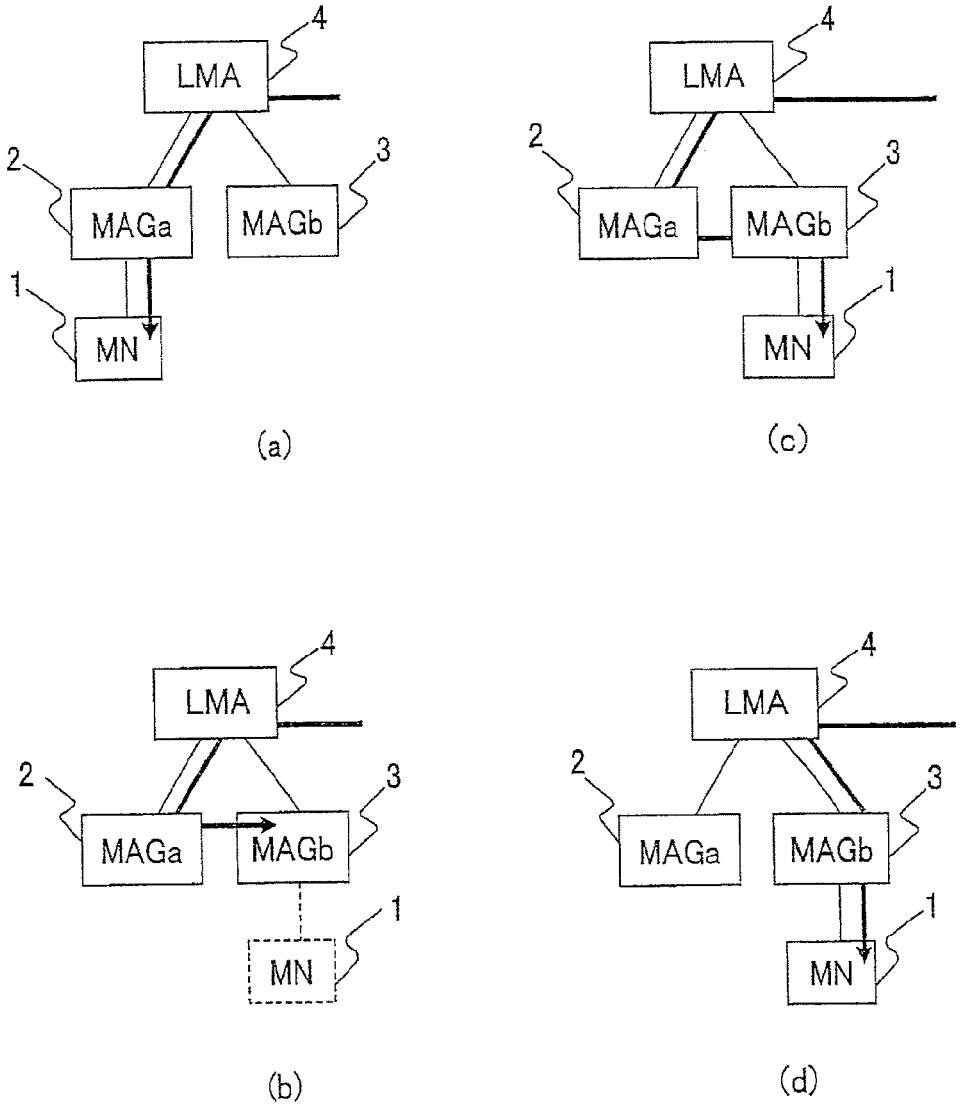
FIG. 9 is a view illustrating the schematic structure of a network in a fourth embodiment and the flow of a packet.

FIG. 9 is a view illustrating the schematic structure of a network in the present embodiment and the flow of a packet.

Figure 10:
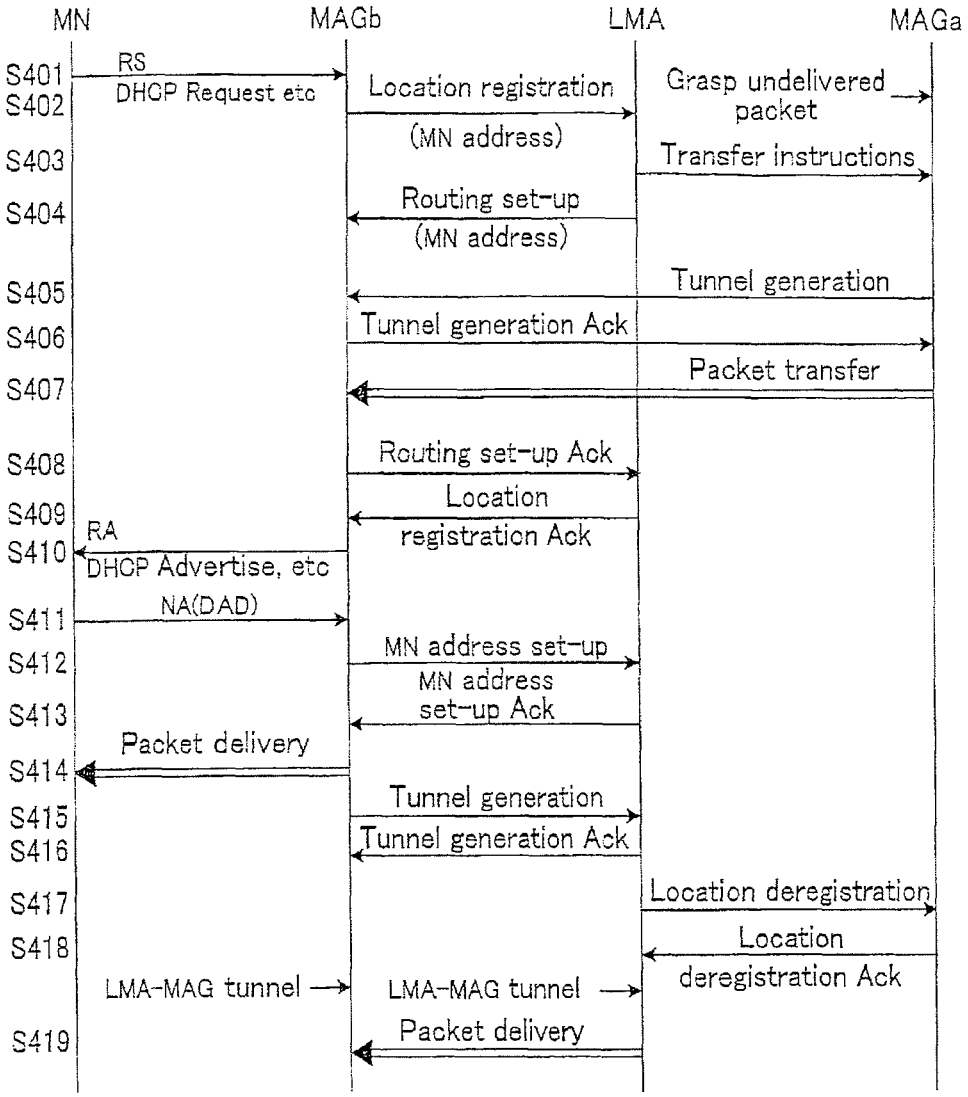
FIG. 10 is a sequence diagram illustrating processing procedures in the fourth embodiment.

FIG. 10 is a sequence diagram illustrating processing procedures in the present embodiment.

In the present embodiment, the MN 1 is under the control of the MAGa 2 at first. A packet at this time is delivered as shown by the emphasized line arrow in FIG. 9(a). Thereafter, the MN 1 is moved to be under the control of the MAGb 3. In the present example, description will be given for an example where just after the MN 1 is moved to be under the control of the MAGb 3, the packet is delivered from the LMA 4 through the MAGa 2 and from the MAGb 3 to the MN 1 (FIG. 9 (b) and FIG. 9 (c)), and subsequently delivered from the LMA 4 to the MAGb 3 without passing through the MAGa 2 and from the MAGb 3 to the MN 1 (FIG. 9 (d)) successively in a switching manner.

When the MN 1 moves to a link of the MAGb 3, as shown in FIG. 10, the MN 1 sends a network configuration request, such as an RS, an DHCP Request, or an NA, including at least an MN-ID as an identifier of the MN 1 to the MAGb 3 or in a link local multicast at S401.

The Netlmm control means 7 of the MAGb 3 that has received the network configuration request from the MN 1 sends a location registration including at least its own identifier MAGb-ID and the MN-ID which has been received now to the LMA 4 at S402.

Upon receipt of the location registration from the MAGb 3, the Netlmm control means 12 of the LMA 4 searches a current state of the MN 1 from data held in the storage portion 13 of the LMA 4 with the MN-ID as a key and grasps that the MN 1 is in a state of belonging to the MAGa 2 currently from the data of the LMA 4. The Netlmm control means 12 of the LMA 4 recognizes that the MN 1 is in a state of belonging to the MAGa 2 currently in the data, but when the location registration has come from the MAGb 3, the MN 1 was moved.

Hence, at S403, the Netlmm control means 12 of the LMA 4 sends a transfer instruction notification including the MN-ID, the MAGb-ID of the MAGb 3, and a global address of the MN 1 to the MAGa 2 which is a previous MAG of the MN 1 and sends a routing set-up including at least an LAM-ID as an identifier of the LMA 4 and the global address of the MN 1 to the MAGb 3 at S404.

At S405 and S406, the Netlmm control means 7 of the MAGa 2 that has received the transfer instructions sends a tunnel generation offer to the MAGb 3, and the Netlmm control means 7 of the MAGb 3 sends a tunnel generation Ack to the MAGa 2 to thereby generate a tunnel between the MAGa 2 and the MAGb 3. Whereby, the packet is routed with paths from the LMA 4 to the MAGa 2, from the MAGa 2 to the MAGb 3, and from the MAGb 3 to the MN1 at S407.

The Netlmm control means 7 of the MAGb 3 that has received the routing set-up from the LMA 4 sends a routing set-up Ack to the LMA 4 at S408.

The Netlmm control means 12 of the LMA 4 that has received the routing set-up Ack from the MAGb 3 sends a location registration Ack including at least prefix information of the MN1 to the MAGb 3 at S409.

The Netlmm control means 7 of the MAGb 3 that has received the location registration Ack from the LMA 4 creates address configuration information for the MN 1 such as an RA from the prefix information to send it to the MN 1 at S410.

At S411, the MN 1 performs configuration of the address and performs a DAD for final confirmation with respect to the MAGb 3 by using an NA. With this DAD, at S412, the Netlmm control means 7 of the MAGb 3 sends an MN address set-up including at least the MAGb-ID of the MAGb 3, the MN address, and the MN-ID to the LMA 4. Note that, when a DHCP is used for the network configuration, the DAD can be omitted, and it is also possible that after sending an address to the MN 1 by the DHCP Advertise or the like, the MAGb 3 sends the MN address set-up to the LMA 4 and the procedure proceeds to the following steps.

Next, at S413, the Netlmm control means 12 of the LMA 4 sends an MN address set-up Ack to the MAGb 3, and at S414, the Netlmm control means 7 of the MAGb 3 starts delivery of packets addressed to the MN 1 and received from the MAGa 2.

In the present example, subsequently, a tunnel between the LMA and the MAGb is to be created at S415 and S416. In addition, after this tunnel is formed, in order to delete the LMA-MAGa tunnel, the Netlmm control means 12 of the LMA 4 sends a location deregistration to the MAGa 2 at S417, and the Netlmm control means 7 of the MAGa 2 sends a location deregistration Ack to the LMA 4 to cancel the tunnel setting at S418.

Then, at S419, the Netlmm control means 12 of the LMA 4 starts transfer of the packets to the MAGb 3.

By configuring as described above, when the path for packet delivery is successively switched from the LMA 4 through the MAGa 2 and the MAGb 3 to the MN 1 and from the LMA 4 through the MAGb 3 to the MN 1, it is possible to further reduce packets addressed to the MN 1 that are stored in the buffer of the MAGa 2 compared to the cases of the first to third embodiments.

Fifth Embodiment

Figure 11:
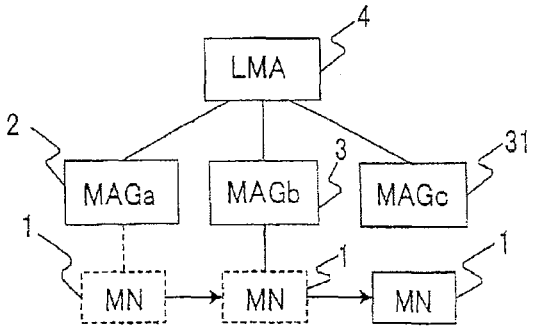
FIG. 11 is a view illustrating the schematic structure of a network in a fifth embodiment.

FIG. 11 is a view illustrating the schematic structure of a network in the present embodiment.

Figure 12:
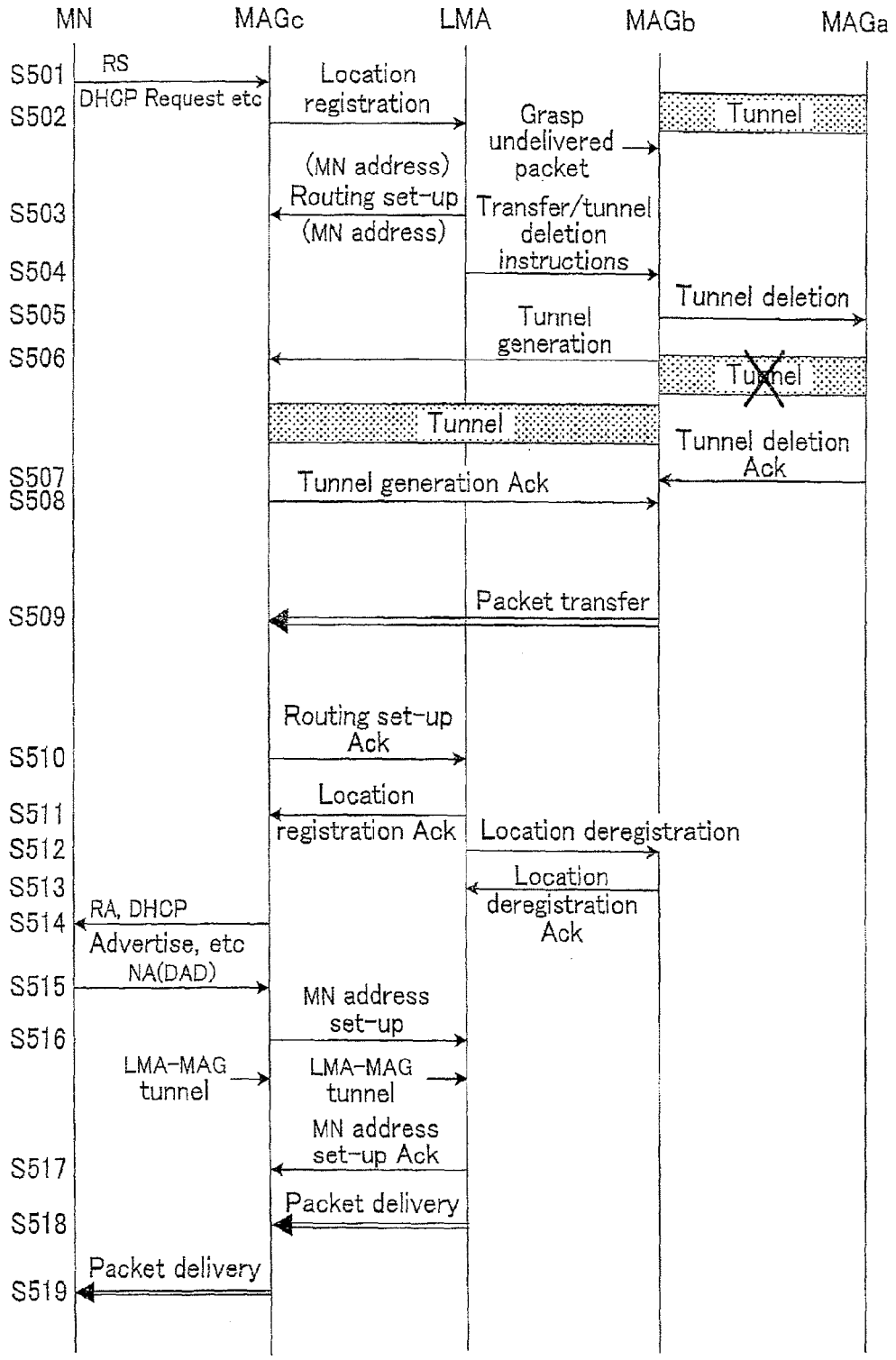
FIG. 12 is a sequence diagram illustrating processing procedures in the fifth embodiment.

FIG. 12 is a sequence diagram illustrating processing procedures in the present embodiment.

Description will be given for an example where, as shown in FIG. 11, first, the MN 1 moves from a link of the MAGa 2 to a link of the MAGb 3, and then to a link of an MAGc 31, and control for communication switch of the MN 1 is performed by the LMA 4.

In the present embodiment, the MN 1 performs switching of communication with three MAGs.

As shown in FIG. 12, after movement, the MN 1 sends information for a network configuration to the MAGc 31 as an MAG of a new link as usual at S501. This information is considered to include, for example, an RS, a DHCP Request, an NA and the like. The information for the network configuration includes an MN-ID as an identifier of the MN.

Based on the information received from the MN 1, the Netlmm control means 7 of the MAGc 31 saves information of the MN in the storage portion 8 and sends a location registration to the LMA 4 at S502. This location registration includes an MAGc-ID as an identifier of the MAGc 31 and the MN-ID.

The Netlmm control means 12 of the LMA 4 that has received the location registration from the MAGc 31 searches data base in the storage portion 13 with the MN-ID as a key, and recognizes that the MN 1 is currently in a state of being in a link of the MAGb 3 in the data and that the MAGb 3 has a tunnel with the MAGa 2. As a result that the location registration is received, the Netlmm control means 12 of the LMA 4 detects that the MN 1 is moving and in a handover, and temporarily stores the MAGb-ID, the MAGc-ID and the MN-ID as a set, and the MAGa-ID, the MAGb-ID and the MN-ID as a set. Then, at S503, the Netlmm control means 12 of the LMA 4 generates a routing set-up (routing setting instructions) including at least an LMA-ID as an identifier of the LMA 4 and a global address of the MN 1 and sends it from the Netlmm communication means 10 to the MAGc 31.

Further, at S504, the Netlmm control means 12 of the LMA 4 sends to the MAGc 3 a notification for instructing transfer of the packets addressed to the MN 1 to the MAGc 31 and deletion of the tunnel with the MAGa 2. It is preferable that this instruction notification includes at least the MAGa-ID, the MAGc-ID and the MN-ID, control information of the instruction notification describes to the effect that the tunnel (for packets addressed to the MN 1) is deleted in association with the MAGa-ID and the tunnel (for packets addressed to the MN 1) is generated in association with the MAGc-ID, and these control information are synthesized and sent simultaneously. Moreover, at this time, the Netlmm control means 12 of the LMA 4 accesses data base in the storage portion 13, and stores information to the effect that information of the tunnel between the MAGb 3 and the MAGa 2 is deleted and a tunnel between the MAGc 31 and the MAGb 3 is newly formed in data of the MAG-MAG tunnel in communication information of the MN 1.

Upon receipt of the instructions of the transfer and the instructions of tunnel deletion from the LMA 4, the Netlmm control means 7 of the MAGb 3 sends to the MAGa 2 an instruction notification describing control information to the effect that the tunnel including at least the MAGb-ID and the MN-ID is deleted, at S505 and sends to the MAGc 31 an instruction notification describing control information for offering tunnel generation including at least the MAGb-ID and the MN-ID at S506.

At S507, the Netlmm control means 7 of the MAGa 2 deletes tunnel setting between the MAGa 2 and the MAGb 3 from the routing table in the storage portion 8, and sends a tunnel deletion Ack for confirmation to the MAGb 3 to delete the tunnel. However, here, when deleting the tunnel setting at the MAGa 2, a confirmation notification is sent to the MAGb 3, thus it is necessary to store the MAGb-ID and the MN-ID temporarily.

At S508, the Netlmm control means 7 of the MAGc 31 sets a tunneling with the MAGb 3 concerning the packets addressed to the MN 1 into the routing table in the storage portion 8, and sends a tunnel generation Ack for confirmation to the MAGb 3. Whereby, the packets addressed to the MN 1 are transferred to the MAGc 31 at S509.

The Netlmm control means 7 of the MAGc 31 that has received the routing set-up from the LMA 4 sends a routing set-up Ack to the LMA 4 at S510.

The Netlmm control means 12 of the LMA 4 that has received the routing set-up Ack from the MAGc 31 sends a location registration Ack including at least prefix information of the MN 1 to the MAGc 31 at S511.

Further, at S512, the Netlmm control means 12 of the LMA 4 sends a location deregistration to the MAGb 3 in order to delete the tunnel between the LMA 4 and the MAGb 3 to the MAGb 3, and, at S513, the Netlmm control means 7 of the MAGb 3 deletes tunnel setting concerning the LMA 4-MAGb 3 from the routing table in the storage portion 8, and sends a location deregistration Ack to the LMA 4 to cancel the tunnel setting.

The Netlmm control means 7 of the MAGc 31 that has received the location registration Ack from the LMA 4 generates address configuration information for the MN 1 such as an RA from the prefix information to send it to the MN 1 at S514.

At S515, the MN 1 performs configuration of the address and performs a DAD for final confirmation with respect to the MAGc 31 by using an NA. With this DAD, the Netlmm control means 7 of the MAGc 31 sends an MN address set-up including at least the MAGc-ID, the MN address, and the MN-ID to the LMA 4 at S516.

Then, at S517, the Netlmm control means 12 of the LMA 4 accesses data base of the storage portion 13, deletes data of the MAGb 3 and stores data of the MAGc 31 in the data concerning the MAG that delivers packets in communication information of the MN 1, and sends an MN address set-up Ack to the MAGc 31, and the Netlmm control means 12 of the LMA 4 starts transfer of the packets to the MAGc 31 at S518. Further, the Netlmm control means 7 of the MAGc 31 starts delivery of the packets to the MN 1 at S519.

Figure 13:
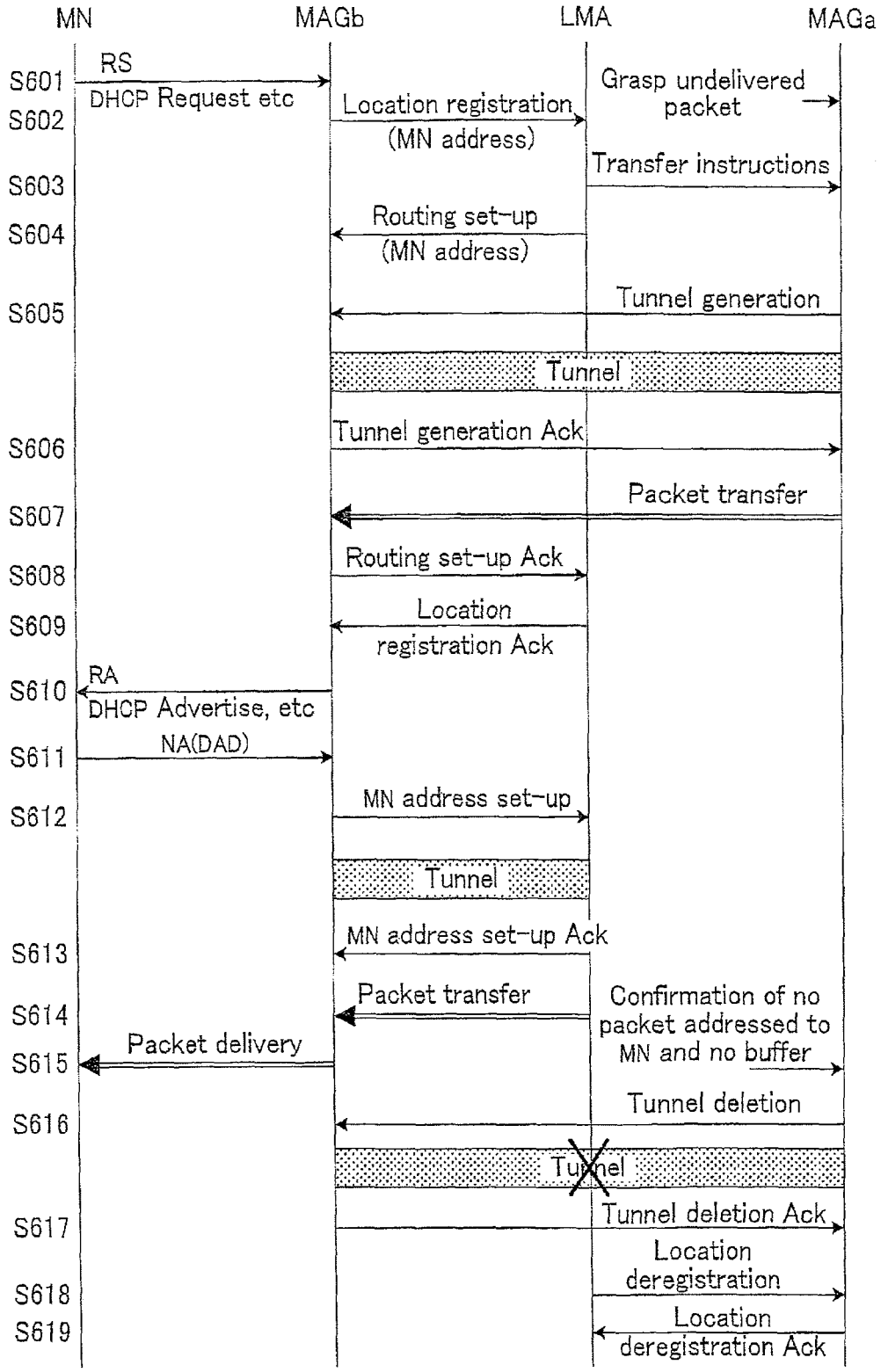
FIG. 13 is a sequence diagram illustrating processing procedures in a sixth embodiment.

As described above, by cancelling tunnel setting for transfer at a timing when transfer between the MAGs is not required, it is possible to release a resource of the MAG effectively Sixth Embodiment FIG. 13 is a sequence diagram illustrating processing procedures in the present embodiment.

In the present embodiment, similarly to FIG. 1 of the first embodiment, although description will be given taking the case where the MN 1 moves from the MAGa 2 to the MAGb 3 as an example, a characteristic point lies in that the MAGa 2 itself cancels a tunnel with the MAGb 3 at a timing when there is no packets addressed to the MN 1 in the buffer of the router MAGa 2 at a movement source.

As shown in FIG. 13, at S601, the MN 1 sends information for a network configuration, for example, an RS to the MAGb 3 which is a new MAG as usual. This information includes an MN-ID as an identifier of the MN.

At S602, the Netlmm control means 7 of the MAGb 3 sends a location registration to the LMA 4 based on the received information. This location registration includes an MAGb-ID as an identifier of the MAGb 3 and the MN-ID.

The Netlmm control means 12 of the LMA 4 that has received the location registration searches a data base in the storage portion 13 with the MN-ID as a key, and recognizes that the MN 1 is currently in a state of being under the control of the MAGa 2 in the data. As a result that the location registration is received, the Netlmm control means 12 of the LMA 4 detects that MN 1 is moving and in a handover, and temporarily stores the MAGa-ID, the MAGb-ID, and the MN-ID as a set. Then, at S603, the Netlmm control means 12 of the LMA 4 sends to the MAGa 2 a notification for instructing transfer of the packets addressed to the MN 1 to the MAGb 3. It is preferable that this instruction notification includes at least the MAGb-ID and the MN-ID and describes control information to the effect that the tunnel (for packets addressed to the MN 1) is generated in association with the MAGb-ID simultaneously.

At S604, the Netlmm control means 12 of the LMA 4 generates a routing set-up including at least an LMA-ID as an identifier of the LMA 4 and a global address of the MN 1 to send it to the MAGb 3.

Upon receipt of the transfer instructions from the LMA 4, the Netlmm control means 7 of the MAGa 2 offers generation of a tunnel including at least the MAGa-ID and the MN-ID to the MAGb 3 at S605.

At S606, the Netlmm control means 7 of the MAGb 3 sets a tunneling with the MAGa 2 concerning the packets addressed to the MN 1 in the routing table in the storage portion 8, and sends a tunnel generation Ack for confirmation to the MAGa 2. Whereby, a tunnel for buffer transfer of the MAGa 2 is generated between the MAGa 2 and the MAGb 3, and the MAGa 2 starts transfer of the packets addressed to the MN 1 to the MAGb 3 at S607.

The Netlmm control means 7 of the MAGb 3 that has received the routing set-up from the LMA 4 sends a routing set-up Ack to the LMA 4 at S608.

The Netlmm control means 12 of the LMA 4 that has received the routing set-up Ack from the MAGb 3 sends a location registration Ack including at least prefix information of the MN 1 to the MAGb 3 at S609.

The Netlmm control means 7 of the MAGb 3 that has received the location registration Ack from the LMA 4 creates address configuration information for the MN 1 such as an RA from the prefix information to send it to the MN 1 at S610.

At S611, the MN 1 performs configuration of the address and performs a DAD for final confirmation with respect to the MAGb 3 by using an NA. With this DAD, the Netlmm control means 7 of the MAGb 3 sends an MN address set-up including at least the MAGb-ID of the MAGb 3, the MN address, and the MN-ID to the LMA 4 at S612.

The Netlmm control means 12 of the LMA 4 accesses data base of the storage portion 13, deletes data of the MAGa 2 and stores data of the MAGb3 in the data concerning the MAG that delivers the packets in communication information of the MN 1 to generate a tunnel between the MAGb 3 and the LMA 4, and sends an MN address set-up Ack to the MAGb 3 at S613, and the Netlmm control means 12 of the LMA 4 starts transfer of the packets to the MAGb 3 at S614. Further, the Netlmm control means 7 of the MAGb 3 starts delivery of the packets to the MN 1 at S615.

As a result that the tunnel is generated between the LMA 4 and the MAGb 3, the packets addressed to the MN 1 are not delivered to the MAGa 2, and the packets addressed to the MN 1 that have been buffered in the MAGa 2 are reduced when transferred to the MAGb 3. The Netlmm control means 7 of the MAGa 2 monitors the buffer of the temporal storage portion 9, and when the buffer reaches zero, tunnel deletion is notified to the MAGb 3 to delete the tunnel.

That is, at S616, the Netlmm control means 7 of the MAGa 2 deletes tunnel setting between the MAGa 2 and the MAGb 3 from the routing table in the storage portion 8, and sends a notification for instructing deletion of the tunnel to the MAGb 3. It is preferable that this instruction notification includes at least MAGa-ID and the MN-ID, and control information of the instruction notification describes that the tunnel (for packets addressed to the MN 1) is deleted in association with the MAGa-ID.

The Netlmm control means 7 of the MAGb 3 sends a tunnel deletion Ack for confirmation to the MAGa 2 at S617.

Further, at S618, the Netlmm control means 12 of the LMA 4 sends a location deregistration to the MAGa 2 in order to delete the tunnel between the LMA 4 and the MAGa 2 with respect to the MAGa 2, and at S619, the Netlmm control means 7 of the MAGa 2 deletes tunnel setting concerning the LMA 4 and the MAGa 2 from the routing table in the storage portion 8, and sends a location deregistration Ack to the LMA 4 to cancel the tunnel setting.

By configuring as described above, when the buffer of the MAG at a transfer source reaches zero, the MAG at the transfer source automatically cancels tunnel setting with the MAG at a transfer destination, thus making it possible to release a resource of the MAG effectively.

Seventh Embodiment

Figure 14:
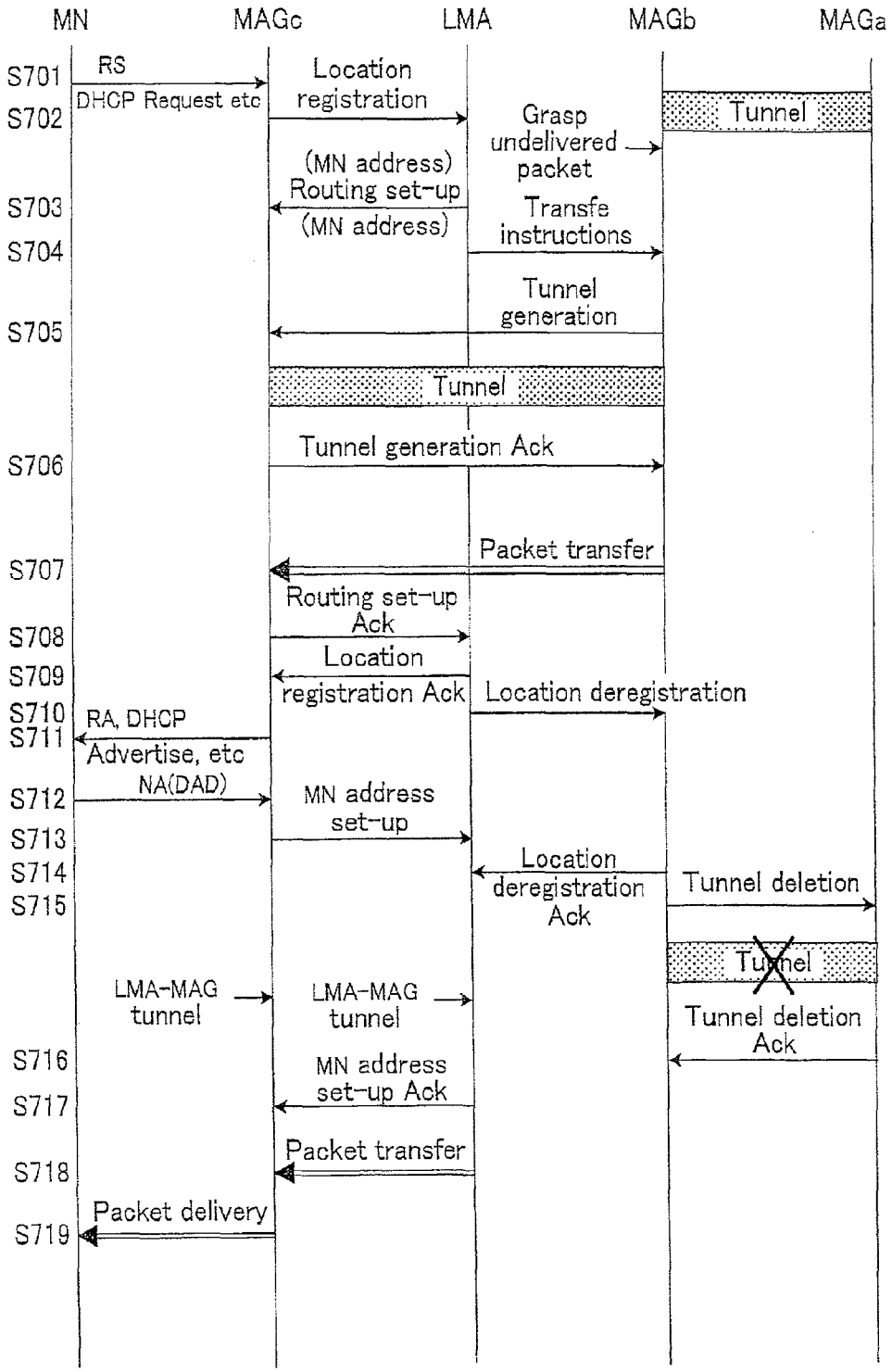
FIG. 14 is a sequence diagram illustrating processing procedures in a seventh embodiment.

FIG. 14 is a sequence diagram illustrating processing procedures in the present embodiment.

In the present embodiment, similarly to the fifth embodiment, description will be given with reference to an example when the MN 1 moves from a link of the MAGa 2 to a link of the MAGb3, and then moves to a link of the MAGc 31 as shown in FIG. 11.

A different point from the fifth embodiment is that the MAGb 3 deletes a tunnel with the MAGa 2 when receiving a location deregistration from the LMA 4.

As shown in FIG. 14, at S701, the MN 1 sends information for a network configuration to the MAGc 31 which is a new MAG as usual. This information is considered to include, for example, an RS, a DHCP Request, an NA and the like. This information includes at least an MN-ID as an identifier of the MN.

At S702, the Netlmm control means 7 of the MAGc 31 sends a location registration to the LMA 4 based on the received information. This location registration includes an MAGc-ID as an identifier of the MAGc 31 and the MN-ID.

The Netlmm control means 12 of the LMA 4 that has received the location registration searches data base in the storage portion 13 with the MN-ID as a key, and recognizes that the MN 1 is currently in a state of being in a link of the MAGb 3 in the data and that the MAGb 3 has a tunnel with the MAGa 2. As a result that the location registration is received, the Netlmm control means 12 of the LMA 4 detects that the MN1 is moving and in a handover, and temporarily stores the MAGb-ID, the MAGc-ID and the MN-ID as a set, and the MAGa-ID, the MAGb-ID and the MN-ID as a set, and then, at S703, generates a routing set-up including at least an LMA-ID as an identifier of the LMA 4 and a global address of the MN 1 to send to the MAGc 31.

Further, at S704, the Netlmm control means 12 of the LMA 4 sends to the MAGb 3 a notification for instructing transfer of packets addressed to the MN 1 to the MAGc 31. It is preferable that this instruction notification includes at least the MAGc-ID and the MN-ID, and describes control information to the effect that the tunnel (for packets addressed to the MN 1) is generated in association with the MAGc-ID. Moreover, at this time, the Netlmm control means 12 of the LMA 4 accesses communication information of the MN 1 in data base of the storage portion 13, and stores information to the effect that a tunnel between the MAGb 3 and the MAGc 31 was generated in data of the MAG-MAG tunnel.

Upon receipt of the transfer instructions from the LMA 4, the Netlmm control means 7 of the MAGb 3 offers generation of a tunnel including at least the MAGb-ID and the MN-ID to the MAGc 31 at S705.

At S706, the Netlmm control means 7 of the MAGc 31 sets a tunneling with the MAGb 3 concerning the packets addressed to the MN 1 in the routing table in the storage portion 8, and sends a tunnel generation Ack for confirmation to the MAGb 3. Whereby, a tunnel for buffer transfer of the MAGb 3 is generated between the MAGb and the MAGc, and at S707, the MAGb 3 starts transfer of the packets addressed to the MN 1 to the MAGc 31.

The Netlmm control means 7 of the MAGc 31 that has received the routing set-up from the LMA 4 sends a routing set-up Ack to the LMA 4 at S708.

The Netlmm control means 12 of the LMA 4 that has received the routing set-up Ack from the MAGc 31 sends a location registration Ack including at least prefix information of the MN 1 to the MAGc 31 at S709.

Further, after the tunnel between the LMA 4 and the MAGc 31 is completed, the LMA 4 sends a location deregistration to the MAGb 3.

At S710, the Netlmm control means 12 of the LMA 4 sends the location deregistration to the MAGb 3 in order to delete the tunnel between the LMA 4 and the MAGb 3. This is usually sent to delete the tunnel between the LMA 4 and the MAGb 3 and usually includes the MN-ID, the LMA-ID, and the MAGb-ID. In the present embodiment, to this location deregistration, an MAGa-ID as an identifier of the MAGa 2 and control information for tunnel deletion instructions in connection with the MAGa 2 in association with MAGa-ID are added.

As a result, in the MAGb 3 that has received the location deregistration as described above, in addition to cancel of the tunnel with the LMA 4, the tunnel with the MAGa 2 is also deleted.

On the other hand, the Netlmm control means 7 of the MAGc 31 that has received the location registration Ack from the LMA 4 creates address configuration information for the MN 1 such as an RA from the prefix information to send to the MN 1 at S711.

At S712, the MN 1 performs configuration of the address and performs a DAD for final confirmation with respect to the MAGc 31 by using an NA. With this DAD, at S713, the Netlmm control means 7 of the MAGc 31 sends an MN address set-up including at least the MAGc-ID of the MAGc 31, the MN address, and the MN-ID to the LMA 4.

Further, the Netlmm control means 7 of the MAGb 3 that has received from the LMA 4 the location deregistration to which the control information of tunnel deletion with the MAGa 2 is added, deletes tunneling setting between the LMA 4 and the MAGb 3 from the routing table in the storage portion 8 at S714, and sends a location deregistration Ack to the LMA 4 to cancel the tunneling setting. This location deregistration Ack includes the MAGa-ID of the MAGa 2 and is associated with information showing deletion of the MAG-MAG tunnel.

Upon receipt of the location deregistration Ack from the MAGb 3, the Netlmm control means 12 of the LMA 4 extracts information of deletion of the MAG-MAG tunnel from the location deregistration Ack, recognizes that the tunnel between the MAGb 3 and the MAGa 2 is deleted, and deletes information of the tunnel between the MAGb 3 and the MAGa 2 from communication information of the MN 1 in data base of the storage portion 13.

Further, the Netlmm control means 7 of the MAGb 3 notifies the MAGa 2 of the tunnel deletion to delete the tunnel.

That is, at S715, the Netlmm control means 7 of the MAGb 3 sends a notification for instructing deletion of the tunnel to the MAGa 2. It is preferable that this instruction notification include at least the MAGb-ID and the MN-ID and control information of the instruction notification describes that the tunnel (for packets addressed to the MN 1) is deleted in association with the MAGb-ID.

At S716, the Netlmm control means 7 of the MAGa 2 deletes tunnel setting between the MAGa 2 and the MAGb 3 from the routing table in the storage portion 8 and sends a tunnel deletion Ack for confirmation to the MAGb 3.

Moreover, on the other hand, the Netlmm control means 12 of the LMA 4 that has received the MN address set-up from the MAGc 31 accesses data base of the storage portion 13, deletes data of the MAGb 3 and stores data of the MAGc 31 in data concerning the MAG that delivers packets in communication information of the MN 1, and sends an MN address set-up Ack to the MAGc 31 at S717, and the Netlmm control means 12 of the LMA 4 starts transfer of the packets to the MAGc 31 at S718. Further, the Netlmm control means 7 of the MAGc 31 starts delivery of the packets to the MN 1 at S719.

As described above, in the MAGb 3 that has received from the LMA 4 the location deregistration to which the control information of the tunnel deletion instructions in connection with the MAGa 2 is added, in addition to deletion of the tunnel with the LMA 4, the tunnel with the MAGa 2 is also deleted, thus making it possible to release a source of the MAG effectively.

Eighth Embodiment

Figure 15:
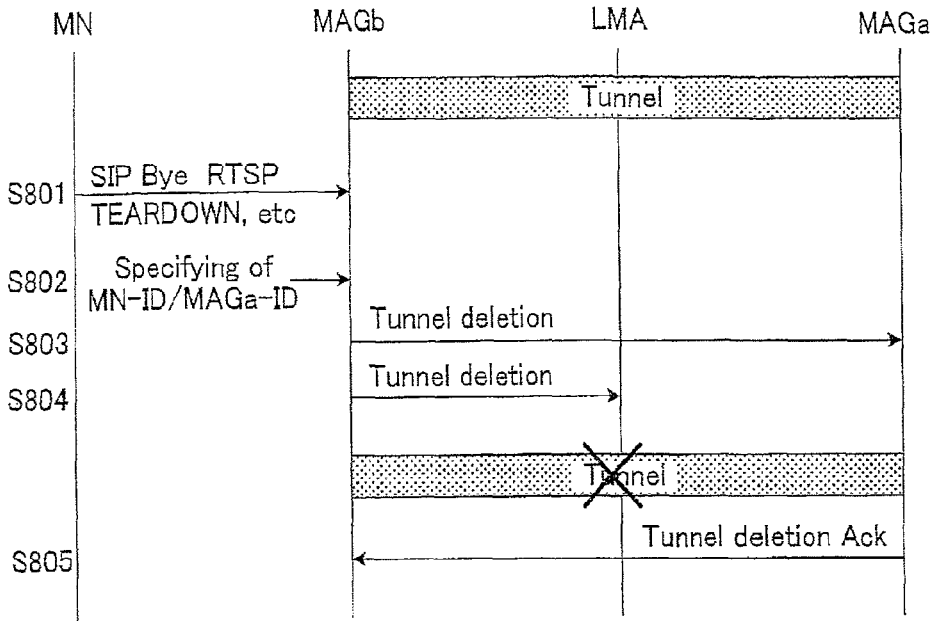
FIG. 15 is a sequence diagram illustrating processing procedures in an eighth embodiment.

FIG. 15 is a sequence diagram illustrating processing procedures in the present embodiment.

In the present embodiment, description will be given for the case where a tunnel between an MAG and an MAG is deleted with normal termination of communication as a trigger, with reference to an example in which the MN 1 moves from a link of the MAGa 2 to a link of the MAGb 3 and then communication is terminated.

When the MN 1 terminates communication normally, termination of the communication is often notified to a communication partner using an SIP (Session Initiation Protocol) which is a protocol for speech control in a session layer as a fifth layer of the OSI Basic Reference Model or an RTSP (Real Time Streaming Protocol) which is a protocol for controlling to distribute data in real time. Since a message for the communication termination passes through an MAG of a link currently used (the MAGb 3 in a link at a movement destination of the MN 1 in the present example), in the MAG of the link at the movement destination, a tunnel deletion instruction notification is sent to an MAG in the link at a movement source (the MAGa 2 in the present example) with receipt of the communication termination message as a trigger.

As shown in FIG. 15, at S801, the MN 1 sends an SIP-Bye or an RTSP-TEARDOWN message to a communication partner for communication termination.

Since the Netlmm control means 7 of the MAGb 3 is to relay this massage to the communication partner, upon receipt of this message, the MN 1 is specified from a source address and the like to obtain an MN-ID as an identifier of the MN 1. In addition, the message itself is transferred in accordance with a protocol for IP communication. Upon receipt of the MN-ID, at S802, the Netlmm control means 7 of the MAGb 3 refers to the routing table concerning the MN-ID in the storage portion 8, confirms a transfer state, detects that a tunnel is held between the MAGb 3 and the MAGa 2, and, at S803, sends a tunnel deletion instruction notification to the MAGa 2.

At S804, the Netlmm control means 7 of the MAGb 3 sends a deletion notification for the MAG-MAG tunnel to the LMA 4. This tunnel deletion notification includes the MAGa-ID, the MAGb-ID and the MN-ID, and is associated with information showing deletion of the MAG-MAG tunnel.

At S805, upon receipt of the tunnel deletion instruction notification from the MAGb 3, the Netlmm control means 7 of the MAGa 2 deletes tunnel setting between the MAGa 2 and the MAGb 3 from the routing table in the storage portion 8, and sends a tunnel deletion Ack for confirmation to the MAGb 3. Here, instead of S804, the MAGa 2 may send the MAG-MAG tunnel deletion notification to the LMA 4. In this deletion notification, information is described as described above.

Further, when it is not necessary that the LMA 4 grasps information concerning the MAG-MAG tunnel like in the second embodiment, the procedure to send such a tunnel deletion notification to the LMA 4 can be omitted.

Further, information of the MAG-MAG tunnel deletion as described above may be added to the location registration that is sent from the MAGb 2 to the LMA 4.

By configuring as described above, a message for communication termination sent from the MN is received by an MAG at a movement destination link that performs relaying, by using this as a trigger, the MAG at a movement destination can send to the MAG at a movement source a deletion instruction notification for tunnel setting that has been used for transferring, thus making it possible to release a resource of the MAG effectively.

Ninth Embodiment

Figure 16:
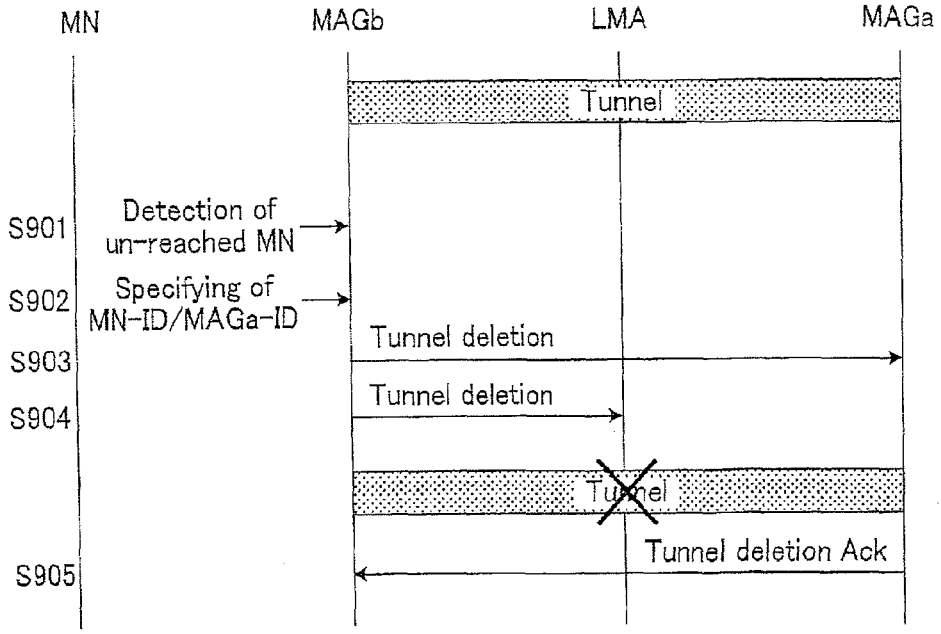
FIG. 16 is a sequence diagram illustrating processing procedures in a ninth embodiment.

FIG. 16 is a sequence diagram illustrating processing procedures in the present embodiment.

In the present embodiment, description will be given for the case where a tunnel between an MAG and an MAG is deleted with abnormal termination of communication in the MN 1 as a trigger with reference to an example where the MN 1 moves from a link of the MAGa 2 to a link of the MAGb 3 and communication is terminated abnormally then.

When communication is terminated abnormally because of the MN 1 being moved to out-of-service area and the like, the MN 1 can not notify the MAG of communication termination in a session layer, thus a method like in the eighth embodiment is unusable.

As shown in FIG. 16, the Netlmm control means 7 of the MAG (the MAGb 3 in the present example) uses means such as a neighbor discovery (ND, Neighbor Discovery, RFC2461) to detect that the MN 1 is not in its own link at S901.

Subsequently, at S902, the Netlmm control means 7 of the MAGb 3 grasps an MN-ID as an identifier of the disappeared MN 1 from the routing table in the storage portion 8 and grasps a transfer state of this MN 1. As a result, the Netlmm control means 7 of the MAGb 3 grasps that a transfer state by tunneling with the MAGa 2 is held and at S903, notifies the MAGa 2 of that a tunnel for packets concerning the MN 1 is to be deleted.

At S904, the Netlmm control means 7 of the MAGb 3 sends a deletion notification of the MAG-MAG tunnel to the LMA 4. The tunnel deletion notification includes the MAGa-ID, the MAGb-ID, and the MN-ID, and is associated with information showing deletion of the MAG-MAG tunnel.

Upon receipt of the instruction notification for tunnel deletion, the Netlmm control means 7 of the MAGa 2 deletes tunnel setting with the MAGb 3 from the routing table of the storage portion 8, and at S905, returns a tunnel deletion Ack to the MAGb 3. Here, instead of S904, the MAGa 2 may send the MAG-MAG tunnel deletion notification to the LMA 4. In this deletion notification, information is described as described above.

Further, when it is not necessary that the LMA 4 grasps information concerning the MAG-MAG tunnel like in the sixth embodiment, the procedure to send such a tunnel deletion notification to the LMA 4 can be omitted.

Further, information of the MAG-MAG tunnel deletion as described above may be added to the location deregistration that is sent from the MAGb 3 to the LMA 4.

By configuring as described above, even when communication with the MN is terminated abnormally, the MAG that has been in the same link with the MN until then sends a tunnel deletion instruction notification to the partner MAG that has performed tunnel setting for transfer for the MN, thus making it possible to release a resource of the MAG effectively.

Tenth Embodiment

Figure 17:
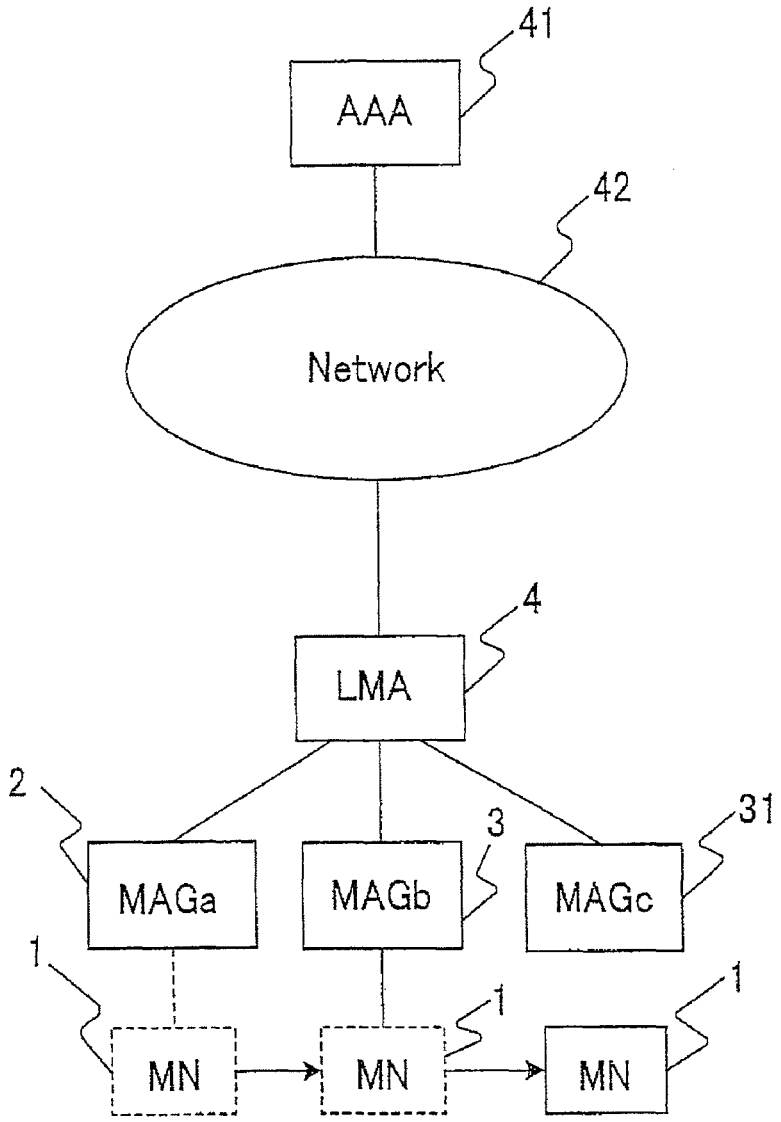
FIG. 17 is a view illustrating the schematic structure of a network in a tenth embodiment.

FIG. 17 is a view illustrating the schematic structure of a network in the present embodiment.

Figure 18:
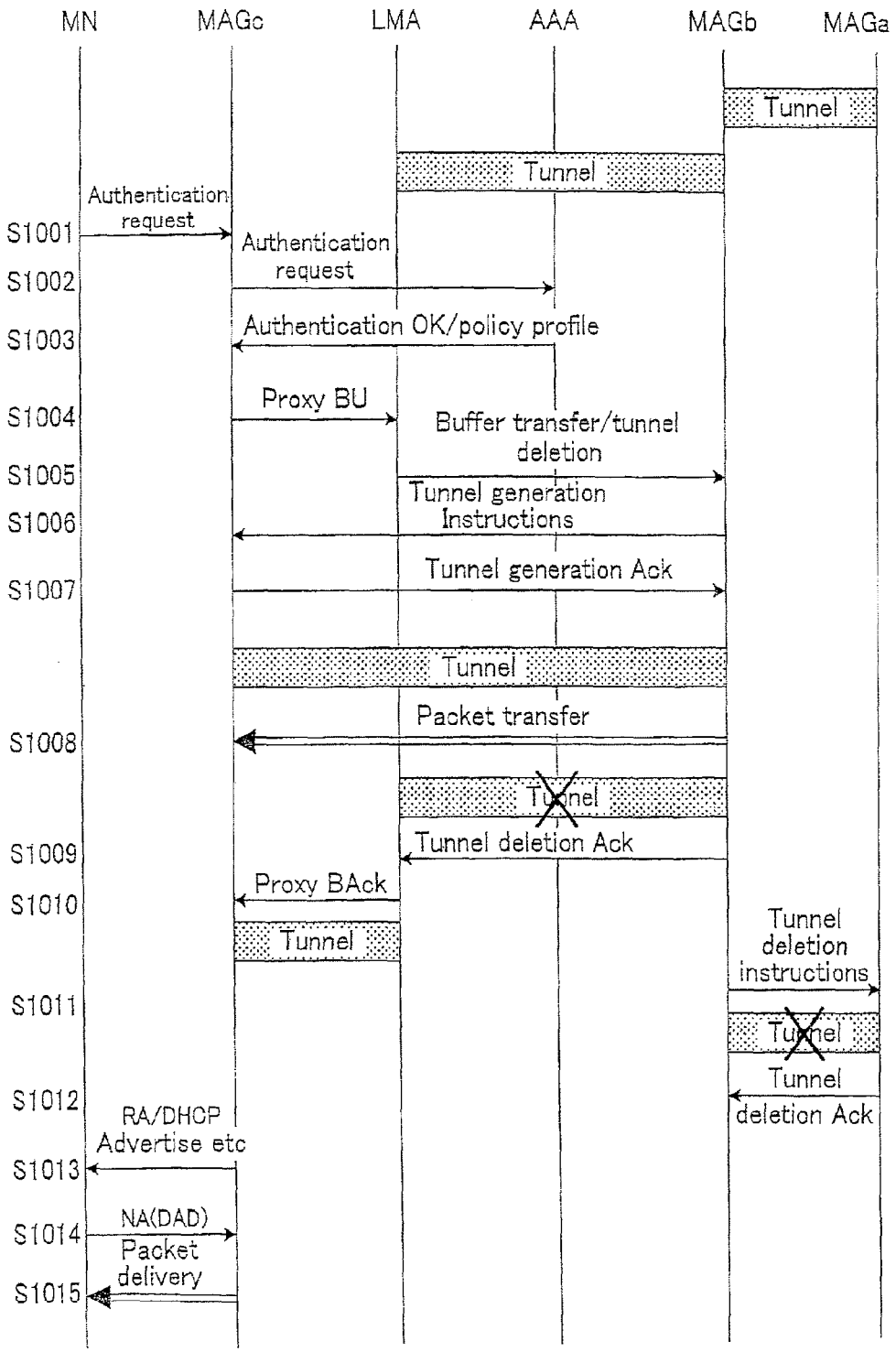
FIG. 18 is a sequence diagram illustrating processing procedures in the tenth embodiment.

FIG. 18 is a sequence diagram in the present embodiment. In the present embodiment, description will be given for a method for performing a handover without loss in packets and deleting a tunnel efficiently when a Proxy Mobile IP system is used as a network base IP mobility protocol.

The Proxy Mobile IP system is a system in which using an AAA (Authentication Authorization Accounting, authentication, authorization, accounting) server that performs an authentication and the like, the MAG carries out a proxy (proxy) function of the MN in the Mobile IP.

As shown in FIG. 17, description will be given with reference to an example where the MN 1 that has moved from a link of the MAGa 2 to a link of the MAGb 3 moves to a link of the MAGc 31.

An AAA server 41 and the LMA 4 in the Proxy Mobile IP system are connected through a network (Network) 42.

At S1001 in FIG. 18, after movement, the MN 1 sends information for authentication to the MAGc 31 which is an MAG of a new link as usual. This information is considered to use an EAP (Extensible Authentication Protocol) and the like. This authentication request includes an MN-ID as an identifier of the MN 1.

The MAGc 31 that has received the authentication request from the NIN 1 sends authentication information to the AAA server 41 at S1002. The authentication information includes the MN-ID.

The AAA server 41 that has received the authentication request from the MAGc 31 searches data base provided in the server with the MN-ID as a key to determine whether to authorize the authentication.

When authorizing the authentication, information of the MN 1 including home address information of the MN 1 and address information of the LMA 4 in data base is sent to the MAGc 31 as a policy profile at S1003.

At S1004, the MAGc 31 that has received the authentication authorization/policy profile creates a Proxy BU (Binding Update) based on information obtained from the policy profile to send to the LMA 4.

The LMA 4 that has received the Proxy BU sends a buffer transfer/tunnel deletion instruction notification including address information of the MAGc 31 to the MAGb 3 which is an MAG belonged before movement at S1005.

The MAGb 3 that has received the buffer transfer/tunnel deletion instruction notification sends a tunnel generation instruction notification to the MAGc 31 at S1006.

The MAGc 31 that has received the tunnel generation instruction notification from the MAGb 3 generates a tunnel from the MAGb 3 to the MAGc 31 and sends a tunnel generation Ack to the MAGb 3 at S1007.

The MAGb 3 that has received the tunnel generation Ack transfers data addressed to the MN 1 stored in the buffer of the MAGc 31 at S1008. Further, at S1009, the MAGb 3 breaks the tunnel between the LMA 4 and the MAGb 3 with the LMA 4 and sends a tunnel deletion Ack to the LMA 4.

The LMA 4 that has received the tunnel deletion Ack sends a Proxy BAck (Binding Update Acknowledgement) to the MAGc 31 at S1010. As a result, a tunnel between the LMA 4 and the MAGc 31 is generated.

On the other hand, at S1011, the MAGb 3 sends a tunnel deletion instruction notification to the MAGa 2.

The MAGa 2 that has received the tunnel deletion instruction notification from the MAGb 3 deletes the tunnel between the MAGa 2 and the MAGb 3, and at S1012, sends a tunnel deletion Ack to the MAGb 3.

The MAGc 31 that has received the Proxy BAck from the LMA 4 sends information for an address configuration such as an RA and a DHCP Advertise to the MN 1 at S1013.

The MN 1 that has received address configuration information from the MAGc 31 performs an NA (DAD) at S1014.

When address setting of the MN 1 is completed so that packets can be received, then the MAGc 31 starts transfer of the packets addressed to the MN 1 to the MN 1 at S1015.

In the present embodiment, it has been described that also in the Proxy Mobile IP system, communication can be performed without loss in packets at the time of a handover, and with deletion of the tunnel between the LMA and the MAG as a trigger, an unnecessary tunnel between an MAG and an MAG is also deleted so that a resource of the MAG can be released effectively.

That is, when the Proxy Mobile IP system is employed, actions/advantages according to the present invention are the same.

Eleventh Embodiment

In the present embodiment, description will be given for another example where a Proxy Mobile IP system is used as a network base IP mobility protocol.

Figure 19:
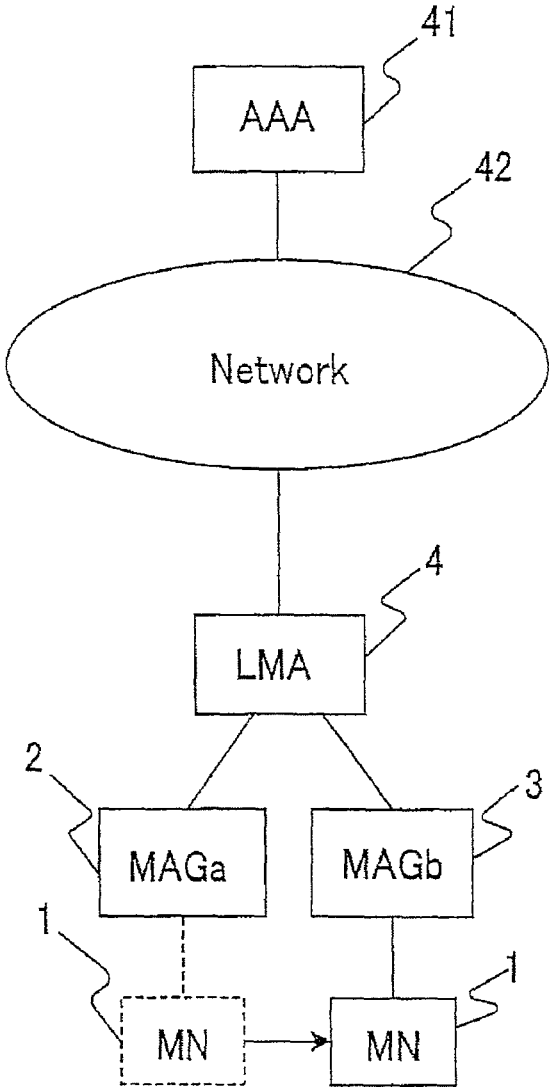
FIG. 19 is a view illustrating the schematic structure of a network in an eleventh embodiment.

FIG. 19 is a view illustrating the schematic structure of a network in the present embodiment.

Figure 20:
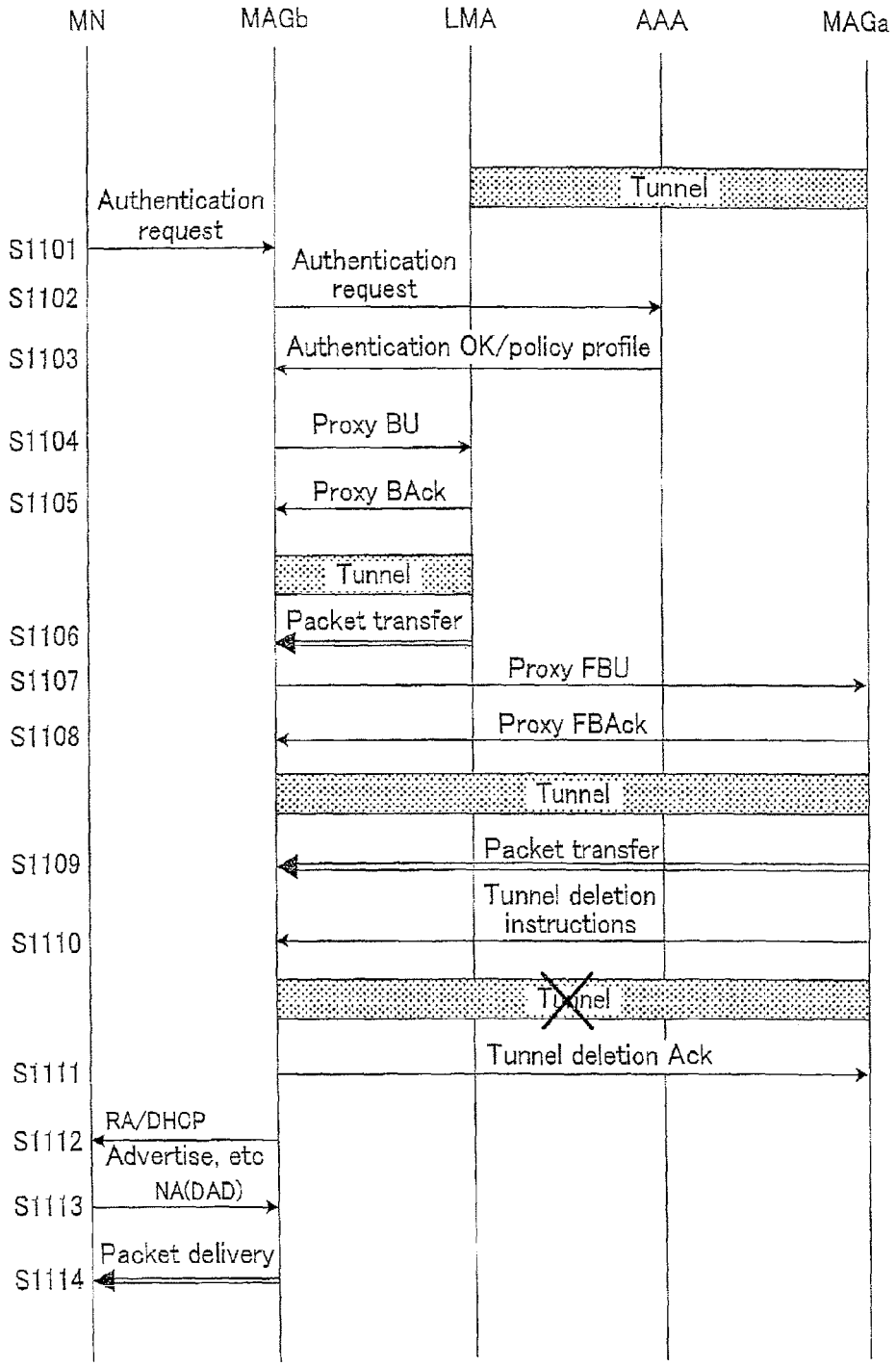
FIG. 20 is a sequence diagram illustrating processing procedures in the eleventh embodiment.
Figure 21:
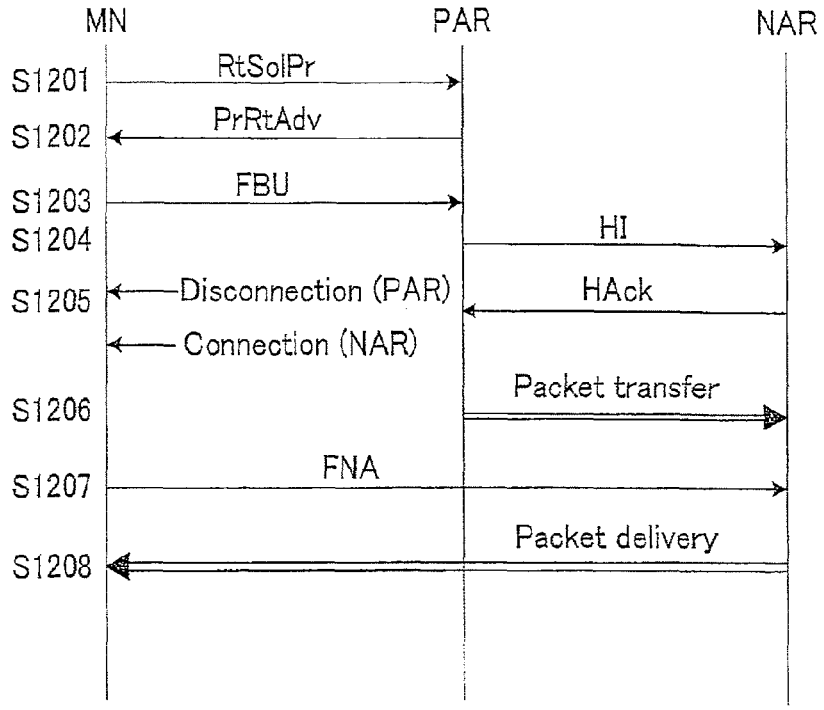
FIG. 21 is a sequence diagram illustrating processing procedures in a fast handover method.
Figure 22:
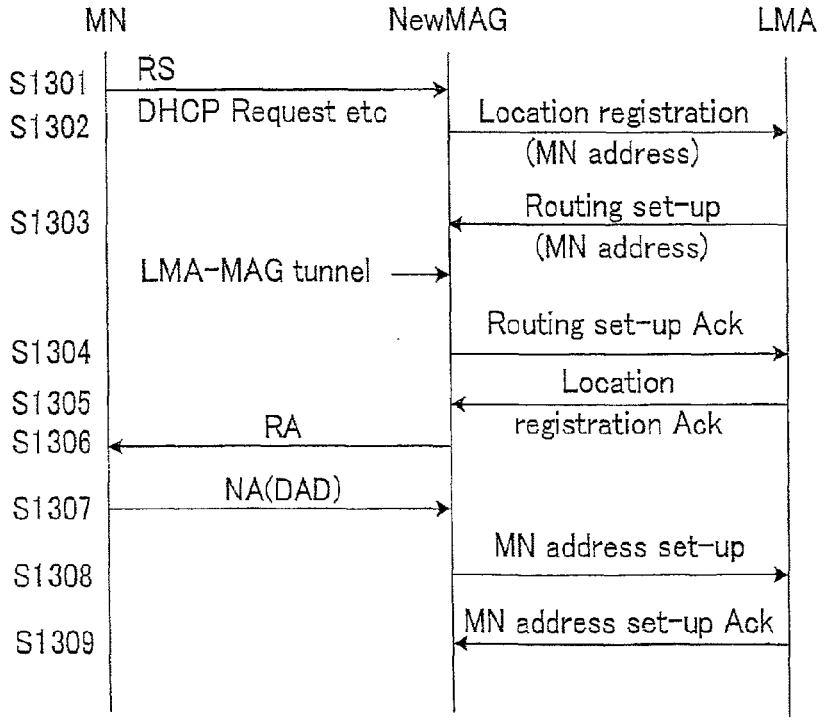
FIG. 22 is a sequence diagram illustrating processing procedures in a handover method for a conventional network base IP mobility protocol.
Figure 23:
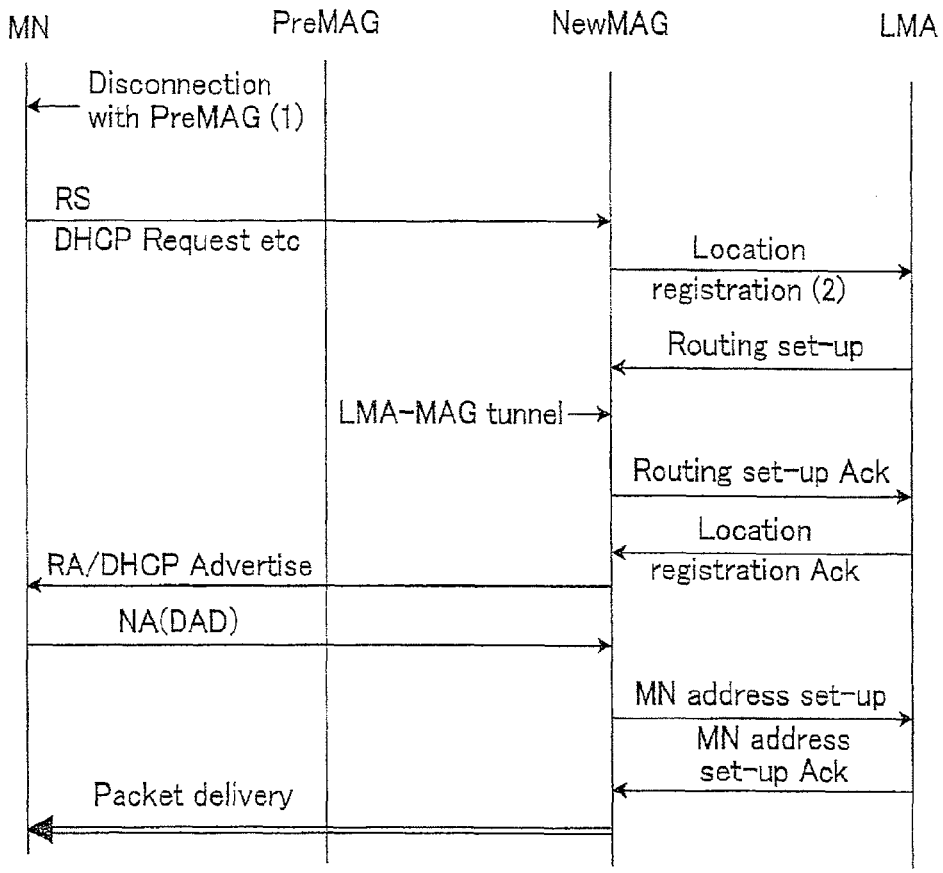
FIG. 23 is a sequence diagram illustrating processing procedures of a handover method for a conventional network base IP mobility protocol.

FIG. 20 is a sequence diagram in the present embodiment. In the present embodiment, the MN 1 moves from a link of the MAGa 2 to a link of the MAGb 3. The MAGb 3 generates a tunnel with the LMA 4 and thereafter sends an instruction notification for tunnel generation and buffer transfer to the MAGa 2. The MAGa 2 sends an instruction notification for tunnel deletion to the MAGb 3 when there is no buffer.

At S1101 in FIG. 20, after movement, the MN 1 sends information for authentication to the MAGb 3 which is an MAG of a new link as usual. This information is considered to use an EAP and the like. This authentication request includes an MN-ID as an identifier of the MN 1.

The MAGb 3 that has received the authentication request from the MN 1 sends authentication information to the AAA server 41 at S1102. The authentication information includes the MN-ID.

The AAA server 41 that has received the authentication request from the MAGb 3 searches data base with the MN-ID as a key to determine whether to authorize the authentication. When authorizing the authentication, information of the MN 1 including home address information of the MN 1 and address information of the LMA 4 in data base is sent to the MAGb 3 as a policy profile at S1103.

At S1104, the MAGb 3 that has received the authentication authorization/policy profile from the AAA server creates a Proxy BU based on information obtained from the policy profile to send to the LMA 4.

The LMA 4 that has received the Proxy BU from the MAGb 3 returns a Proxy BAck to the MAGb 3 at S1105. The Proxy BAck includes address information of the MAGa 2 which is an MAG before the handover. With this Proxy BAck, a tunnel between the LMA 4 and the MAGb 3 is generated.

The MAGb 3 that has received the Proxy BAck from the LMA 4 generates the tunnel between the LMA 4 and the MAGb 3, and at S1106, packet transfer from the LMA 4 to the MAGb 3 is started. At S1107, the MAGb 3 further generates a Proxy FBU (Fast Binding Update) based on information obtained from the Proxy BAck to send it to the MAGa 2.

At S1108, the MAGa 2 that has received the Proxy FBU from the MAGb 3 generates a Proxy FBAck to send it to the MAGb 3. As a result, since a tunnel between the MAGa 2 and the MAGb 3 is completed, the MAGa 2 starts buffer transfer of packets addressed to the MN 1 at S1109.

Since packets addressed to the MN 1 that are delivered to the LMA 4 are delivered to the MAGb 3, the buffer of the packets addressed to the MN 1 in the MAGa 2 disappear when transferred to the MAGc 31. When the buffer disappears, the MAGa 2 sends a tunnel deletion instruction notification to the MAGb 3 at S1110.

At S1111, the MAGb 3 that has received the tunnel deletion instruction notification from the MAGa 2 deletes the tunnel from the MAGa 2 to the MAGb 3 and sends a tunnel deletion Ack to the MAGa 2. Further, as a result of receiving the tunnel deletion instruction notification, the MAGb 3 can determine that all of the packets to be transferred to the MN 1 have been received. Hence, at S1112, an RA for an address configuration is sent to the MN 1.

The MAGa 2 that has received the tunnel deletion Ack from the MAGb 3 deletes the tunnel from the MAGa 2 to the MAGb 3.

The MN 1 that has received the RA from the MAGb 3 performs an NA (DAD) for a duplicate address confirmation at S1113. Note that, this step can be omitted.

When the address configuration in the MN 1 is completed, the MAGb 3 starts transfer of the packets addressed to the MN 1 to the MN 1 at S1114.

As described above, in the Proxy Mobile IP system, the MAG at a movement destination of the MN 1 generates the tunnel with the LMA and thereafter sends an instruction notification for tunnel generation and buffer transfer to an MAG at a movement source, thus making it possible to perform a handover without loss in packets.

Further, the MAG at a movement source sends an instruction notification for tunnel deletion to the MAG at a movement destination when there is no buffer, thus making it possible to perform release of a resource of the MAG efficiently.

Note that, a communication system using a network IP mobility protocol of the present invention, a control apparatus, a router and a communication method thereof will not be limited to the above-described examples shown in the drawings, and various modifications may be certainly made within the scope of the present invention.

INDUSTRIAL APPLICABILITY

A communication system using a network IP mobility protocol of the present invention, a control apparatus, a router and a communication method thereof are capable of eliminating loss in packets during a handover and releasing a resource of a router effectively in a network base IP mobility protocol where a mobile terminal is movable without mounting a special protocol.

What is claimed:

1. A communication system, comprising:

a mobile node;

a source relaying intermediate node at a movement source of the mobile node; and a destination relaying intermediate node at a movement destination of the mobile node, wherein before, during and after the relaying intermediate nodes are switched in accordance with movement of the mobile node, the mobile node continues communication using a same predetermined address assigned to the mobile node, based on switching of the relaying intermediate nodes, a data transfer route is established from the source relaying intermediate node to the destination relaying intermediate node, and data is transferred from the source relaying intermediate node to the destination relaying intermediate node at the movement destination, and the source relaying intermediate node sends a transfer termination notification to the destination relaying intermediate node when the data transfer is terminated, wherein the source relaying intermediate node continues the data transfer by maintaining the data transfer route until data to be transferred in a buffer for storing temporary transfer data has become zero.

2. The communication system according to claim 1, wherein the data transfer route is deleted based on the transfer cancel notification.

3. The communication system according to claim 1, wherein the source relaying intermediate node deletes the data transfer route when the data transfer is terminated.

4. A mobile node in the communication system according to claim 1, the mobile node comprising:

a processor that receives the data from the destination relaying intermediate node, said data being transferred from the source relaying intermediate node to the destination relaying intermediate node through the data transfer route.

5. A communication control method comprising:

switching relaying intermediate nodes in accordance with a movement of a mobile node, continuing communication using a same predetermined address assigned to the mobile node both before and after the switching of the relaying intermediate nodes, based on the switching of the relaying intermediate nodes, establishing a data transfer route from a relaying intermediate node at a movement source of the mobile node to a relaying intermediate node at a movement destination of the mobile node, performing a data transfer from the relaying intermediate node at the movement source to the relaying intermediate node at the movement destination, and sending a transfer cancel notification from the relaying intermediate node at the movement source to the relaying intermediate node at the movement destination when the data transfer is terminated, wherein the relaying intermediate node at the movement source of the mobile node continues the data transfer by maintaining the data transfer route until data to be transferred in a buffer of the relaying intermediate node at the movement source for storing temporary transfer data has become zero.

6. The communication control method according to claim 5, further comprising deleting the data transfer route based on the transfer cancel notification.

7. The communication control method according to claim 5, further comprising deleting the data transfer route when the data transfer is terminated.

8. The communication control method according to claim 5, further comprising sending the data from the relaying intermediate node at the movement destination to the mobile node, said data being transferred from the relaying intermediate node at the movement source to the relaying intermediate node at the movement destination through the data transfer route.

*9. A communication control method used in a relaying intermediate node at a movement source of a mobile node when a handover is performed, the communication control method comprising:*

*establishing a data transfer route to a relaying intermediate node at a movement destination of the mobile node;*

*performing a data transfer using the data transfer route to transfer user data, the user data having been received from an anchor node, the user data being addressed to the mobile node, and the user data being stored in a buffer provided in the relaying intermediate node at the movement source of the mobile node;*

*continuing the data transfer of the user data as long as the buffer has not been emptied; and*

*sending a transfer cancel notification to the relaying intermediate node at the movement destination of the mobile node.*

*10. The communication control method according to claim 9, wherein the transfer cancel notification is a notification to release a data forwarding resource.*

*11. A relaying intermediate node at a movement source of a mobile node which performs a part of a handover, the relaying intermediate node comprising:*

*a control unit configured to establish a data transfer route to a relaying intermediate node at a movement destination of the mobile node;*

*a buffer configured to store data; and*

*a communication unit configured to,*

*perform a data transfer using the data transfer route to transfer user data, the user data having been received from an anchor node and the user data being addressed to the mobile node, and the user data being stored in the buffer,*

*continue the data transfer of the user data as long as the buffer has not been emptied, and*

*send a transfer cancel notification to the relaying intermediate node at the movement destination of the mobile node.*

*12. The relaying intermediate node according to claim 11, wherein the transfer cancel notification is a notification to release a data forwarding resource.*

* * * * *